(12) United States Patent
Baker et al.

(10) Patent No.: US 11,835,180 B2
(45) Date of Patent: Dec. 5, 2023

(54) GAS SYSTEM

(71) Applicant: MARLIN GAS SERVICES, LLC, Spring Hill, FL (US)

(72) Inventors: Kenneth Lynn Baker, Tarpon Springs, FL (US); Paul Sydney Richards, Lady Lake, FL (US)

(73) Assignee: Marlin Gas Services, LLC, Spring Hill, FL (US)

( * ) Notice: Subject to any disclaimer, the term of this patent is extended or adjusted under 35 U.S.C. 154(b) by 0 days.

(21) Appl. No.: 16/909,504

(22) Filed: Jun. 23, 2020

(65) Prior Publication Data
US 2021/0396358 A1 Dec. 23, 2021

(51) Int. Cl.
*F17C 13/04* (2006.01)

(52) U.S. Cl.
CPC ........ *F17C 13/04* (2013.01); *F17C 2221/033* (2013.01); *F17C 2225/0123* (2013.01); *F17C 2250/032* (2013.01); *F17C 2250/034* (2013.01)

(58) Field of Classification Search
CPC ............... F17C 13/04; F17C 2221/033; F17C 2225/0123; F17C 2250/032; F17C 2250/034; F17D 1/02

USPC ............................................................ 137/2
See application file for complete search history.

(56) References Cited

U.S. PATENT DOCUMENTS

| | | | | |
|---|---|---|---|---|
| 4,139,019 A | * | 2/1979 | Bresie | F17C 5/002 |
| | | | | 137/351 |
| 4,213,476 A | * | 7/1980 | Bresie | E21B 43/00 |
| | | | | 137/2 |
| 2022/0049818 A1 | * | 2/2022 | Bugnicourt | F17C 13/004 |

OTHER PUBLICATIONS

PG&E Policy Fact Sheet. Found at https://www.pge.com/includes/docs/pdfs/about/environment/pge/cleanair/CNG_PolicyChangesFactsheet_Final.pdf (Year: 2014).*

* cited by examiner

*Primary Examiner* — Timothy P. Kelly
*Assistant Examiner* — Christopher M Afful

(57) ABSTRACT

A method includes receiving, by a computing device, electronic information about pressure. The method further includes determining, by the computing device, the pressure is at a particular threshold. The method further includes sending, by the computing device, a communication to close a particular valve and prevent gas flow from a first tank. The method further includes sending, by the computing device, another communication to open another valve and allow gas flow from a second tank.

23 Claims, 19 Drawing Sheets

| | RUN A (1602) | | | | | | | | Flow (1618) | | Pressure (1620) | | | RUN B (1604) | | | |
|---|---|---|---|---|---|---|---|---|---|---|---|---|---|---|---|---|---|
| | Flow (1606) | | Pressure (1608) | | | VALVE (1610) | LIGHT (1612) | OUTPUT ACTION (1616) | YES | NO | HIGH | LOW | PRESSURE | VALVE (1622) | LIGHT (1624) | OUTPUT ACTION (1626) |
| | YES | NO | HIGH | LOW | PRESSURE | | | | | | | | | | | |
| 1628 | | X | | | STEADY | CLOSED | STAND-BY | | | X | | | FALLING | OPEN | OPERATIONAL | OPERATIONAL POSITION LATCHED (1) |
| 1630 | | X | X | | STEADY | CLOSED | STAND-BY | | X | | | | FALLING | OPEN | EMPTY | |
| 1632 | | X | X | | FALLING | OPENING | STAND-BY/OPERATIONAL | RECEIVED OUTPUT FROM RUN B TO OPEN VALVE A | X | | | X | FALLING | CLOSING | OPERATIONAL/EMPTY | CLOSE VALVE B / OPEN VALVE A |
| 1634 | X | | | | FALLING | OPEN | OPERATIONAL | OPERATIONAL POSITION LATCHED (1) | | X | X | | STEADY | CLOSED | EMPTY | OPERATIONAL LATCH DROPPED (2) |
| 1636 | X | | | | FALLING | OPEN | OPERATIONAL | CLOSE VALVE A OPEN VALVE B | | X | X | | RISING | CLOSED | EMPTY/STANDBY | RESET TO STANDBY MODE |
| 1638 | | X | | | FALLING | OPEN | OPERATIONAL/EMPTY | | | X | | | STEADY | CLOSED | STANDBY | RECEIVED OUTPUT FROM RUN A TO OPEN VALVE |
| 1640 | X | | | | STEADY | CLOSED | EMPTY | OPERATIONAL LATCH DROPPED (2) | | X | | X | FALLING | OPENING | STAND-BY/OPERATIONAL | |
| 1642 | | X | | | STEADY | CLOSED | EMPTY | | X | | | X | FALLING | OPEN | OPERATIONAL | OPERATIONAL POSITION LATCHED (1) |
| 1644 | | X | | | STEADY | CLOSED | EMPTY/STANDBY | RESET TO STANDBY MODE | X | | | X | FALLING | OPEN | OPERATIONAL | |
| 1646 | | X | | | RISING | CLOSED | STANDBY | | | X | | | FALLING | OPEN | OPERATIONAL | |
| 1648 | | X | | | STEADY | CLOSED | STANDBY | | X | | | | FALLING | OPEN | OPERATIONAL | |

FIG. 16

| Valve (1702) | Position (1704) | | | Location (1706) | | | Status (1708) | |
|---|---|---|---|---|---|---|---|---|
| | open | closed | By Pass | Trailer A | Trailer B | Common | Trailer A | Trailer B |
| V4 | | X | X | | | | | |
| V5 | | X | X | | | | | |
| V6 | | X | X | | | | | |
| V7 | X | | | | | | | |
| V1 | | X | | X | | | | |
| V2 | X | | | X | | | | |
| V3 | X | | | X | | | | |
| V8 | X | | | | X | | | |
| V9 | X | | | | X | | | |
| V10 | X | | | | X | | | |
| Pressure alarm low low | | | | | | | | |
| C1 open | | | | X | | | | |
| C2 open | | | | X | | | | |
| V8 Closed | | | | | X | | | |
| C2 Closed | | | | | X | | | |
| V8 Open | | | | | X | | | |

FIG. 17A

| Step | Position (1704) | | Location (1706) | | | | Status (1708) | |
|---|---|---|---|---|---|---|---|---|
| | open | closed | By Pass | Trailer A | Trailer B | Common | Trailer A | Trailer B |
| 1710 all manual valves set as above | | | | | | | | |
| 1712 C1 Open | | | | X | | | Filling | standby |
| 1714 C2 closed | | | | | X | | Filling | standby |
| 1716 V8 Open & Run B Low Low pressure alarm on | | | | | X | | Filling | Standby |
| 1718 High Pressure alarm run A | | | | X | | | Changeover | Changeover |
| 1720 C1 closing & C2 opening | | | | X | X | | Changeover | Changeover |
| 1722 C1 Closed & C2 Open | | | | | X | | Shutdown | Filling |
| 1724 V1 Closed & high pressure alarm on | | | | X | | | Shutdown | Filling |
| 1726 V1 open & pressure decreasing | | | | X | | | Standby | Filling |
| 1728 Run A low low pressure alarm | | | | X | | | Standby | Filling |
| 1730 High pressure alarm Run B | | | | | X | | Changeover | Changeover |
| 1732 C2 closing and C1 Opening | | | | X | X | | Changeover | Changeover |
| 1734 C2 closed and C1 open | | | | X | | | Filling | Shutdown |
| 1736 V8 Closed and High pressure alarm on Run B | | | | | X | | Filling | Shutdown |
| 1738 V8 Open and Run B low low pressure alarm on | | | | | X | | Filling | Stand by |
| 1740 repeat from step 4 | | | | | | | | |

FIG. 17B

GAS SYSTEM

BACKGROUND

Instances may occur that require an end-user of natural gas to use a high-pressure natural gas tank system to provide natural gas to their system. These instances may occur when there is a lack of natural gas from a utility provider or if the end-user is not connected to a natural gas pipeline system. In the event that a high-pressure natural gas system is used, the high-pressure natural gas system may require multiple tanks of high-pressure natural gas. Existing systems do not provide for an efficient and safe changeover between high-pressure tanks without interruption to the delivery of natural gas to the end-user.

BRIEF DESCRIPTION OF DRAWINGS

FIG. 16 is an example process for distributing natural gas; and

FIGS. 17A and 17B are example processes for filling tanks with natural gas.

DETAILED DESCRIPTION OF PREFERRED EMBODIMENTS

Figure 1A:
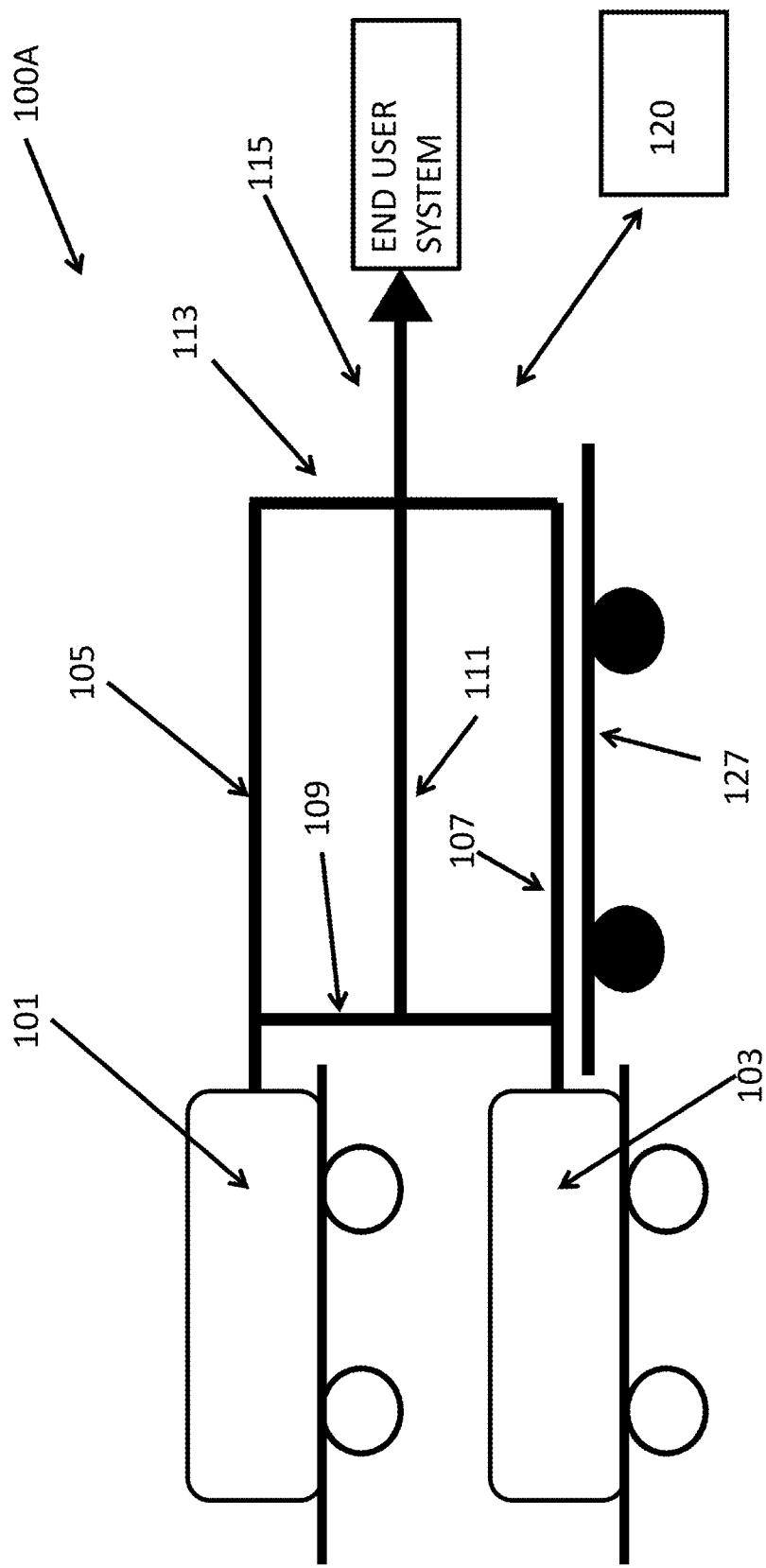
FIGS. 1A and 1B are diagrams of example environments in which systems and/or methods described herein may be implemented.

The following detailed description refers to the accompanying drawings. The same reference numbers in different drawings may identify the same or similar elements. Systems, devices, and/or methods described herein may allow for an automatic changeover between two or more high-pressure sources (e.g. tanks containing natural gas) within a system that discharges natural gas to an end-user system (e.g., a hospital, natural gas utility, etc.). In embodiments, the system, devices, and/or methods described herein, may also be reversed and used to fill natural gas into one or more high-pressure tanks. In embodiments, the pressure in the one or more tanks may be rated at a maximum of 4,000 pounds per square inch gauge (PSIG) based on the construction and type of tank that is being used and the tank's certification capability for receiving and transporting a type of gas within the tanks (e.g., natural gas or another gas, such as nitrogen, hydrogen, biogas, etc.).

In embodiments, natural gas is discharged from a high-pressure source (e.g., tank) through a piping system that includes multiple valves. In embodiments, the pressure, flow rate, and/or temperature of the natural gas is analyzed to determine whether the natural gas within the piping system has a minimum rating for the pressure, flow rate, and/or temperature for delivery of natural gas to an end-user (e.g., a natural gas utility, a commercial user of natural gas, etc.). If the natural gas does not comply with the minimum rating for the pressure, flow rate, and/or temperature, then the system may changeover from one high-pressure source to another high-pressure source (e.g., a tank) of natural gas. Thus, the other high-pressure source will then distribute natural gas through the system. In embodiments, during the switchover, the required rate of natural gas may still be sent from the original high-pressure source as some valves are being opened and others are being closed.

In embodiments, the piping system may contain one or more piping sections and also contain one or more valves, control valves, non-return valves, pressure gauges, temperature gauges, and/or flow rate gauges. In embodiments, the one or more pressure gauges, temperature gauges, and/or flow rate gauges may electronically (e.g., via wireless, satellite, Internet, Intranet systems) send electronic information about pressure, temperature, and/or flow rates to one or more computing devices that monitor the natural gas being distributed within the one or more piping sections.

In embodiments, the one or more computing devices may determine, based on the electronic information about pressure, temperature, and/or flow rates, that an automatic changeover between high-pressure sources is required. Accordingly, the one or more computing devices may electronically communicate with one or more valves, control valves, and/or non-return valves to either open or close depending on which piping sections are required to: (1) prevent natural gas from being dispersed into the piping sections from one high-pressure source; and (2) allow natural gas to be dispersed into the piping sections from another high-pressure source.

In embodiments, the piping system may also be used to fill natural gas into one or more tanks via a compressor system attached to the piping system. In embodiments, the system may include piping sections and one or more valves, control valves, non-return valves, pressure gauges, temperature gauges, and/or flow rate gauges. In embodiments, the system may, via electronic communications with one or more computing device, determine that when one tank is filled (e.g., has reached a particular pressure level such as 4,000 PSIG, 5,000 PSIG, etc.), natural gas is then to be sent to another tank. To send natural gas to another tank (e.g., high-pressure source), electronic communications (generated by one or more computing devices) may be sent to one or more valves, control valves, and/or non-return valves to either open or close one or more valves, control valves, and/or non-return valves. In embodiments, the system may also send electronic communications to a device (e.g., a computer, smartphone, etc.) for display (e.g., via a graphical user interface, display screen, etc.) and are then used to manually change one or more valves. In embodiments, the display can be part of a device or can be located remotely from the device and receive communications from the device in a wireless process (e.g., LTE, 4G, 5G, cellular, etc.).

Accordingly, a system may allow for (1) distribution of natural gas from a high-pressure source (e.g., a tank) into a piping system that includes one more piping sections and one or more valves, control valves, non-return valves, pressure gauges, temperature gauges, and/or flow rate gauges; (2) monitoring of the pressure gauges, temperature gauges, and/or flow rate gauges to determine the pressure, temperature, and/or flow rate of the natural gas being distributed within the piping system; (3) determining whether the pressure, temperature, and/or flow rate of the natural gas are at or above the minimum threshold levels; and (4) continuing to distribute natural gas from the high-pressure source or changing (either manually or automatically) to another high-pressure source by opening or closing one or more valves, control valves, and/or non-return valves.

Also, the system may also be used for (1) distribution of natural gas to a tank via the piping system that includes one more piping sections and one or more valves, control valves, non-return valves, pressure gauges, temperature gauges, and/or flow rate gauges; (2) monitoring of the pressure gauges, temperature gauges, and/or flow rate gauges to determine the pressure, temperature, and/or flow rate of the natural gas being distributed within the piping system; (3) determining whether the tank has reached a particular pressure; and (4) either continuing to distribute natural gas to the tank if the particular pressure is not reached by changing (either manually or automatically) to another tank for receipt of natural gas by opening or closing one more valves, control valves, and/or non-return valves.

FIG. 1A is a schematic diagram of an example system 100A in which systems, devices, and/or methods described herein may be implemented. As shown in FIG. 1A, system 100A includes tank 101 (which is on wheels and can be moved), tank 103 (which is on wheels and can be moved), piping sections 105, 107, 109, 111, 113, and 115, and computing device 120. In embodiments, piping sections 105, 107, 109, 111, 113, and/or 115 may include one more valves, control valves, and non-return valves. In embodiments, one more pressure, temperature, and/or flow rate monitoring devices may be attached to piping sections 105, 107, 109, 111, 113, and/or 115. FIG. 1A shows vehicle 127 (e.g., a trailer, a part of a truck, etc.) which allows system 100A to be moved from one location to another. Also, as shown in FIG. 1A, computing device 120 is shown which may be a part of system 100A.

In embodiments, computing device 120 may determine that natural gas is to be distributed from tank 101 to an end-user system and open particular valves, control valves, and non-return valves to allow the flow of natural gas from tank 101 through one or more of piping sections 105, 107, 109, 111, 113, and/or 115. In embodiments, computing device 120 may also close other valves, control valves, and/or non-return valves to prevent the flow of natural gas from tank 103 to occur at the same or similar time. In embodiments, computing device 120 may receive electronic information from one or more pressure, temperature, and/or flow rate monitoring device that are attached to one or more piping sections. In doing so, computing device 120 may analyze the electronic information and determine whether to continue to permit natural gas from tank 101 to flow through the one or more piping systems.

In embodiments, computing device 120 may determine that natural gas from tank 101 continues to flow based on a threshold pressure, temperature, and/or flow rate readings from the electronic information. If the threshold pressure, temperature, and/or flow rate readings are not being met, computing device 120 may send electronic communications to system 100A that allows for (1) closing one or more valves, control valves, and/or non-return valves to prevent natural gas being released from tank 101 and (2) opening one or more valves, control valves, and/or non-return vales to allow natural gas to be released from tank 103.

Figure 1B:
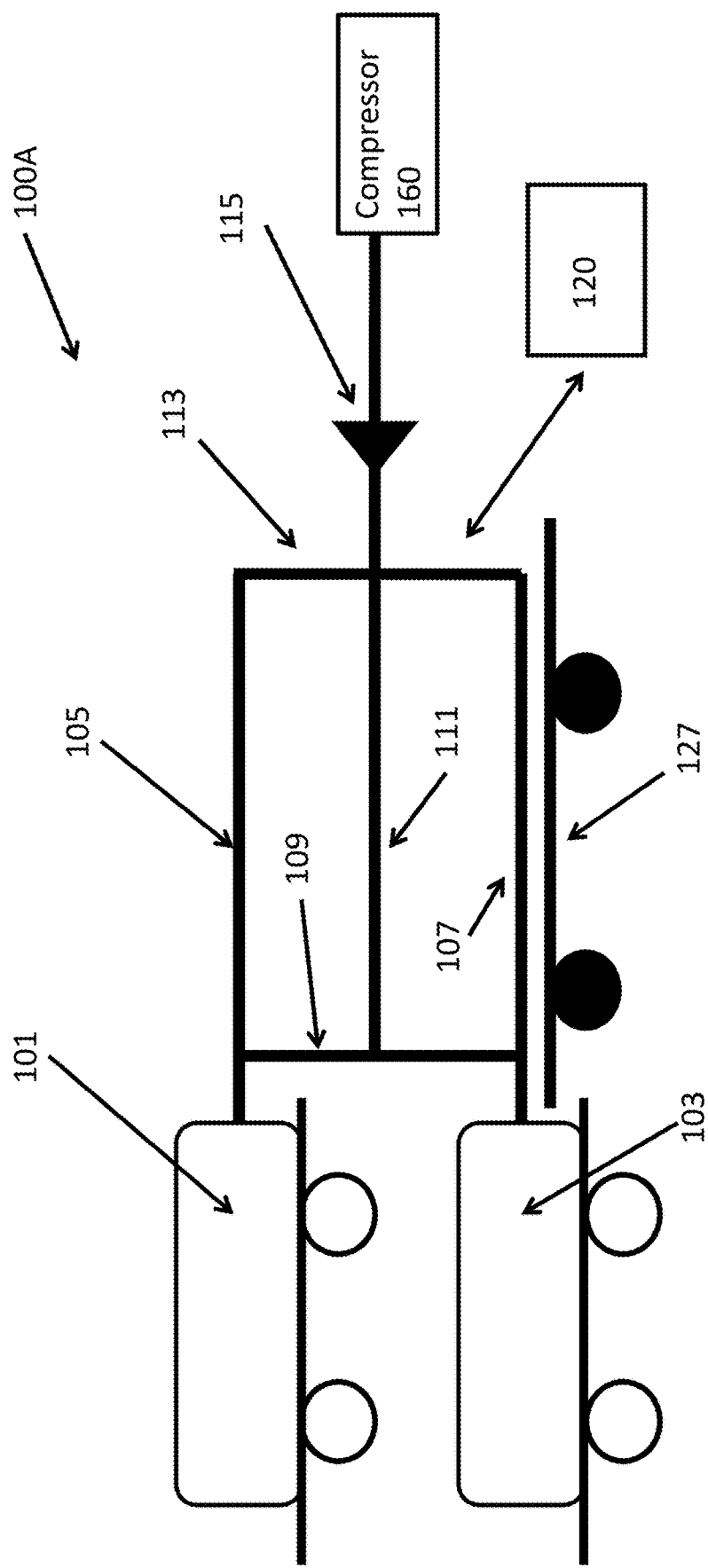

FIG. 1B is an example schematic diagram of distributing natural gas to one or more tanks. As shown in FIG. 1B, system 100A is now being used to supply natural gas to tanks 101 and/or 103. In embodiments, computing device 120 may determine that natural gas is to be distributed to tank 101 (e.g., to fill tank 101 with natural gas) and open particular valves, control valves, and non-return valves to allow the flow of natural gas to tank 101 through one or more of piping sections 105, 107, 109, 111, 113, and/or 115. FIG. 1B shows vehicle 127 (e.g., a trailer, a part of a truck, etc.) which allows system 100A to be moved from one location to another. In embodiments, the non-return valves may be changed in direction so that natural gas is distributed to a tank rather than natural gas is directed away from a tank. In embodiments, at the same or similar time (e.g., within 5 seconds, 10 seconds, one minute, etc.) computing device 120 may also close other valves, control valves, and/or non-return valves to prevent the flow of natural gas to tank 103.

In embodiments, computing device 120 may receive electronic information from one or more pressure, temperature, and/or flow rate monitoring devices that are attached to one or more piping sections. In doing so, computing device 120 may analyze the electronic information and determine whether to continue to permit natural gas to flow through the one or more piping systems into tank 103.

In embodiments, computing device 120 may determine that natural gas continues to flow to tank 101 based on a threshold pressure, temperature, and/or flow rate readings from the electronic information. If the threshold pressure, temperature, and/or flow rate readings are being exceeded, computing device 120 may send electronic communications to system 100B that allows for (1) closing one or more valves, control valves, and/or non-return valves to prevent natural gas being released from tank 101 and (2) opening one or more valves, control valves, and/or non-return vales to allow natural gas to be sent to tank 103. Thus, as shown in FIG. 1A and FIG. 1B, one system can be used for filling natural gas for tanks within the system or distributing natural gas to another system.

Figure 2:
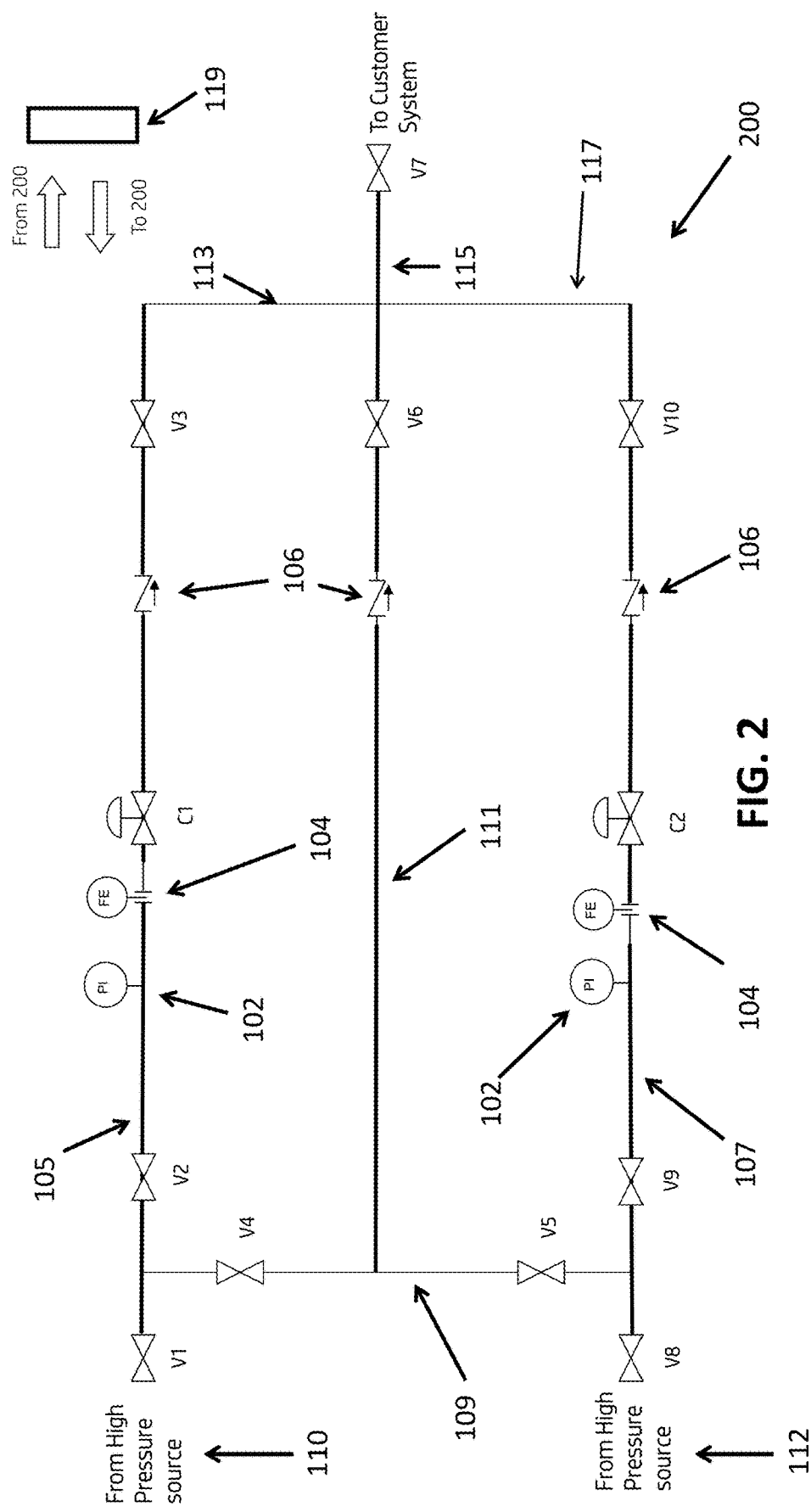
FIGS. 2-9 are schematic diagrams of automatic changeover processes.

FIG. 2 is an example schematic diagram of an automatic changeover process that permits the discharge of natural gas from a high-pressure source (e.g., a tank) into a piping system. As shown in FIG. 2, system 200 includes pressure readers 102 (e.g., pressure gauges, sensors, transducers, etc.), flow rate readers 104 (e.g., flow rate gauges, sensors, transducers, etc.), non-return valves 106, control valves c1 and c2, and valves v1, v2, v3, v4, v5, v6, v7, v8, v9, and v10. In addition, FIG. 2 also shows computing device 119 and high-pressure sources 110 and 112. FIG. 2 also shows piping sections 105, 107, 109, 111, 113, 115 and 117. In embodiments, the piping sections may be composed of any material (e.g., metallic material, plastic-based material, composite material, etc.) that can distribute pressurized natural gas. In embodiments, the piping sections can all be of the same material or with different piping sections composed of different materials. In embodiments, any of the piping sections may be separate piping connected to each other (e.g., connectors, welding, etc.). Alternatively, the piping sections may be all part of one or more piping runs (e.g., 105 and 113 may be one continuous piece of pipe). In embodiments, within each of the piping sections, valves may be installed, such as control valves, valves, and non-return vales. In embodiments, pressure readers and flow rate readers may be attached or connected to one or more of the piping sections to read pressure and flow rates.

In embodiments, based on information received from pressure readers 102 and flow rate readers 104, computing device 119 (e.g., PLC) may determine which of valves v1, v2, v3, v4, v5, v6, v7, v8, v9, and v10 should be open and which should be closed. In embodiments, the information from pressure readers 102 and flow rate readers 104 are used to determine whether high-pressure source 110 or high-pressure source 112 are providing natural gas through the one or more piping sections at or above a minimum threshold pressure and/or flow rate level.

In a non-limiting example, high-pressure source 110 (e.g., a tank with high-pressure natural gas) is connected to the piping (piping section 105). Computing device 119 has sent electronic communications to valves v1, v2, v3, and v7 to be open, and control valve c1 and non-return valve 106 (located on piping section 105) to be open for natural gas flow from high-pressure source 110 into the piping sections 105, 113, and 115. While natural gas is flowing from high-pressure source 110, pressure reader 102 and flow rate reader 104 (on piping section 105) may read pressure and flow rates, respectively (e.g., via sensors). The pressure and flow rate information is then sent electronically to computing device 119. The electronic information may be sent via wire (e.g., fiber optic lines, telecommunication lines) or wirelessly (e.g., cellular system, satellite system, etc.) to computing device 119.

Based on the electronic information, computing device 119 may determine whether to continue to allow natural gas to flow from high-pressure source 110 or provide natural gas from high-pressure source 112. This determination is based on whether the natural gas flowing through the piping sections is at or above a particular pressure level and/or flow rate level (e.g., threshold levels). Thus, the pressure level and flow rate level information is provided in the electronic information and determines whether high-pressure source 110 can provide natural gas at the threshold pressure and flow rate levels.

If computing device 119 determines (based on the electronic information) that natural gas should continue to flow from high-pressure source 110 through the one or more piping sections, then valves v1, v2, v3, and v7 remain open, as well as control valve c1 and non-return valve 106 (located on piping section 105). If computing device 119 determines (based on the electronic information) that natural gas should not continue to flow from high-pressure 110, then computing device 119 may send electronic communications (e.g., wired or wirelessly) to close one or more of valves v1, v2, and v3, as well as control valve c1 and non-return valve 106 (located on piping section 105).

In this non-limiting example, computing device 119 may then determine that natural gas should be sent from high-pressure source 112 via piping sections 107, 117, and 115. To do so, computing device 119 may send electronic communications to v8, v9, and v10, to be open as well as control valve c2 and non-return valve 106 (located on piping section 107). In embodiments, computing device 119 may open valves v8 and v9 first to determine whether high-pressure source 112 has natural gas at a required pressure and/or flow rate. In embodiments, v7 may always stay open or may be closed and then opened during switchover from one high-pressure source to another. Thus, natural gas may flow from high-pressure source 112 to the customer's system. In embodiments, the customer's system may be a natural gas pipeline that is used within a natural gas distribution system, a utility, and/or a commercial/industrial client (e.g., hospital, food processing company, etc.). Pressure reader 102 and flow rate reader 104, located on piping section 107, may read the pressure and flow rate of the natural gas flowing through piping section 107 to determine whether the natural gas is flowing at or above a particular threshold pressure and/or flow rate. If the natural gas flows at the particular threshold pressure and/or flow rate levels, based on electronic information sent from pressure reader 102 and flow rate reader 104 (located on piping section 107), then v8, v9, and v10, as well as control valve c2 and non-return valve 106 remain open. In embodiments, electronic information from pressure reader 102 and flow rate reader 104 (on piping section 107) may be sent to computing device 119 which determines whether high-pressure source 112 has the threshold pressure and flow rate. If high-pressure source 112 no longer has sufficient natural gas supply, one or more valves may be closed. Alternatively, high-pressure source 112 may switch over high-pressure source 110 again if a new tank has been installed (i.e., a new tank as high-pressure source 110).

In another non-limiting example, computing device 119 may determine, based on electronic information from pressure reader 102 and flow rate reader 104 (located on piping section 105) that a change in the pressure and/or flow rate indicates that there is a problem (e.g. leak) with piping section 105 itself (after v2), valves v2, v3, control valve c1, and/or non-return valve 106 (on piping section 105). The problem may be associated with a loss of pressure and/or flow rate when compared to (1) a time when natural gas began to be provided from high-pressure source 110, (2) a particular change in pressure readings within a particular amount of time (e.g., drop of pressure from 4,000 PSIG to 2,500 PSIG within 30 minutes, one hour, etc.), and/or (3) a particular change in flow rate readings within a particular amount of time.

Based on determining that there is a problem with one or more valves on piping section 105 and/or piping section 105 itself (after v2), computing device 119 may close various valves by sending one or more communications to valves, v3, control valve c1, and/or non-return valve 106 (on piping section 105). In addition computing device 119 may send an electronic communication and open valves v4, v6, and non-return valve 106 (on piping section 111) and allow the natural gas from high-pressure source 110 to send natural gas through piping sections 105, 109, 111, and 115. In embodiments, valve v2 is kept open so that pressure readings can be determined for the gas flowing out of high-pressure source 110. Thus, when the pressure readings are below a threshold, computing device 119 can send electronic communications to switch from high-pressure source 110 to high pressure 112. In alternate embodiments, a flow rate reader 104 may be located between v1 and v2 and may be able to read flow rate information about high-pressure source 110 and send the information to computing device 119 in determining to switch from high-pressure source 110 to 112.

In another non-limiting example, computing device 119 may determine, based on electronic information from pressure reader 102 and flow rate reader 104 (located on piping section 107) that there is a change in the pressure and/or flow rate that indicates that there is a problem with piping section 107 itself (e.g., leak), valves v10, control valve c2, and/or non-return valve 106 (on piping section 107). The problem may be associated with a loss of pressure and/or flow rate when compared to (1) a time when natural gas began to be provided from high-pressure source 112, (2) a particular change in pressure readings within a particular amount of time (e.g., drop of pressure from 4,000 PSIG to 2,500 PSIG within 30 minutes, one hour, etc.), and/or (3) a particular change in flow rate readings within a particular amount of time.

Based on determining that there is a problem with one or more valves on piping section 107 and/or piping section 107 itself (after v9), computing device 119 may close various valves by sending one or more communications to valves v10, control valve c2, and/or non-return valve 106 (on piping section 107). In addition, the computing device 119 may send an electronic communication and open valves v5, v6, and non-return valve 106 (on piping section 111) and allow the natural gas from high-pressure source 110 to send natural gas through piping section 109 to piping section 111 and then onto piping section 115. In embodiments, valve v9 (on piping section 107) is kept open so that pressure readings can be determined for the gas flowing out of high-pressure source 112. Thus, when the pressure readings are below a threshold, computing device 119 can send electronic communications to switch from high-pressure source 112 to high pressure 110. In alternate embodiments, a flow rate reader 104 may be located between v8 and v9 and may be able to read flow rate information about high-pressure source 112 and send the information to computing device 119 in determining to switch from high-pressure source 112 to 110.

In another non-limiting example, computing device 119 has switched over from high-pressure source 110 to high-pressure source 112. At a particular time, both high-pressure sources may not have the particular threshold levels that are required to supply natural gas to a customer whose system is connected to system 200. In alternate embodiments, the threshold levels may be dynamic, rather than static, and may change based on an end-user's requirements. For example, an end-user's requirements may change from 500 to 300 PSIG gas and a high-pressure source may have 400 PSIG pressure available. Accordingly, the updated pressure threshold may be used by computing device to determine to continue using the same high-pressure source without any change over. Thus, no changeover may occur as the high-pressure source has pressure above the updated pressure requirement.

Based on the final pressure and/or flow rate readings on piping section 105 and on piping section 107, computing device 119 may determine that a combination of natural gas being supplied from both high-pressure sources 110 and 112 will meet the threshold levels that are required to supply natural gas to a customer whose system is connected to system 200. Accordingly, computing device 119 may open valves v4 and v5 (by sending electronic communications to v4 and v5) while closing control valves c1 and c2. As a result, natural gas from high-pressure sources 110 and 112 may mix together and flow through piping sections 111 and 115. In this non-limiting example, non-return valve 106 (on piping section 111) is also open (via electronic communications from computing device 119). In embodiments, valve v2 and/or v5 is opened so that the combined pressure information can be detected by pressure reader 102 (on piping section 105 and/or 107) to determine how much combined natural gas is flowing through system 200. In embodiments, when both pressure sources are providing natural gas, the combination may result in an equalization of the pressure at both high-pressure sources.

Accordingly, control valves c1 and c2 are closed and, thus, no natural gas enters v7 from piping section 105 and 107. While valve v2 is open, valve v9 may be open or closed. If open, pressure reader 102 (on piping section 107) may also analyze pressure information along with the pressure information being read along piping section 105. In embodiments, pressure information from piping section 105 and 107 may be compared to each other to determine the accuracy of the pressure information (e.g., are both readings within a particular range, such as within 0.5%, 0.9%, etc.). In this non-limiting example, valves v4 and v5 are open.

Figure 3:
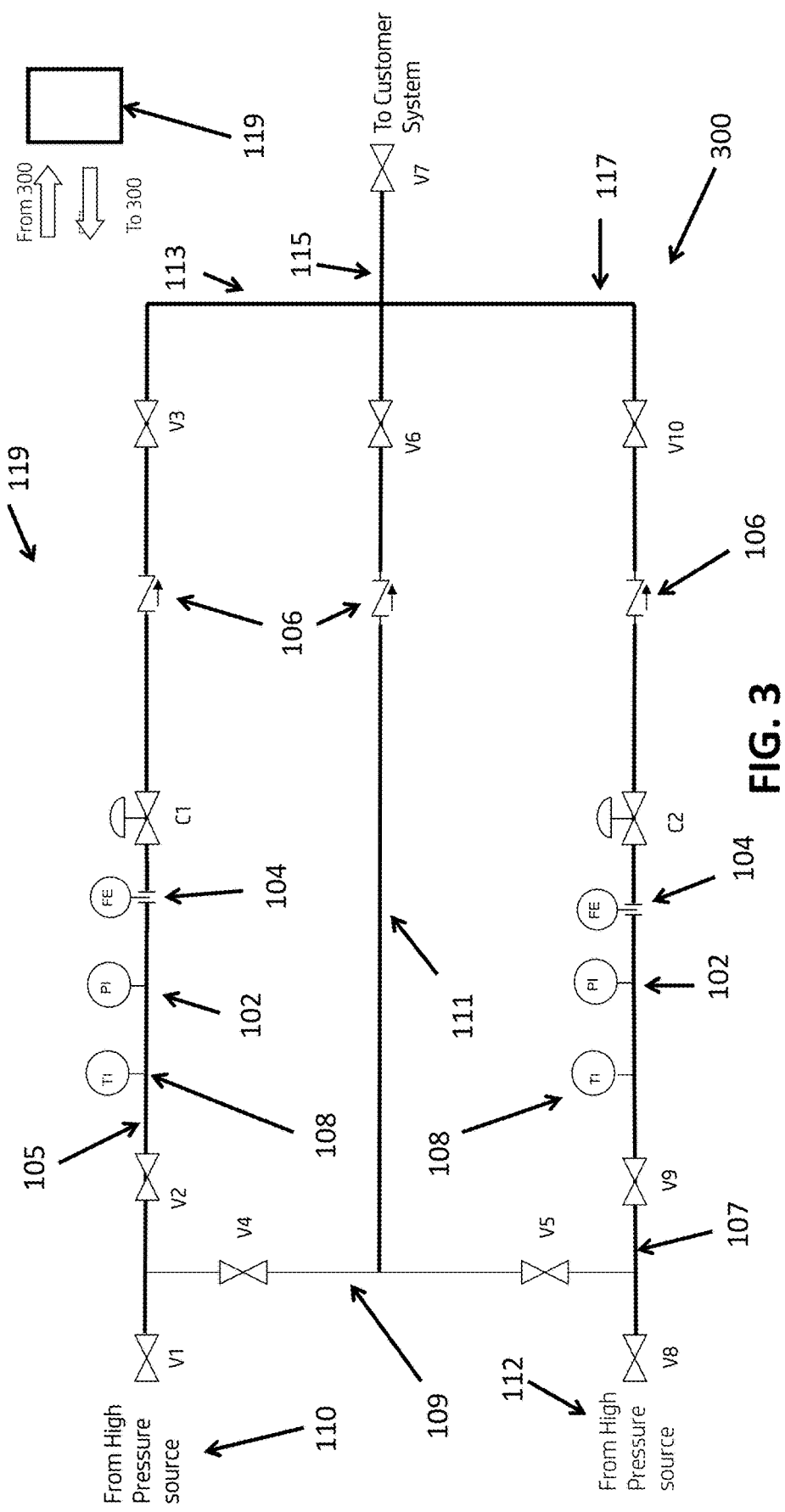

FIG. 3 is an example schematic diagram of an automatic changeover process that permits the discharge of natural gas from a high-pressure source (e.g., a tank) into a piping system. As shown in FIG. 3, system 300 includes pressure readers 102, flow rate readers 104, non-return valves 106, control valves c1 and c2, and valves v1, v2, v3, v4, v5, v6, v7, v8, v9, and v10. In addition, FIG. 3 also shows computing device 119 and high-pressure sources 110 and 112. FIG. 3 also shows piping sections 105, 107, 109, 111, 113, 115 and 117. In embodiments, any of the piping sections may be separate piping connected together (e.g., connectors, welding, etc.). Alternatively, the piping sections may be all part of one or more piping runs (e.g., 105 and 113 may be one continuous piece of pipe). In embodiments, within each of the piping sections, valves may be installed, such as control valves, valves, and non-return valves. In embodiments, pressure readers, temperature readers (e.g., temperature gauges), and flow rate readers may be attached to one or more of the piping sections to read pressure, temperature, and flow rates.

In embodiments, based on information received from pressure readers 102 and flow rate readers 104, computing device 119 (e.g., PLC, remote laptop, mobile phone etc.) may determine which of valves v1, v2, v3, v4, v5, v6, v7, v8, v9, and v10 should be open and which should be closed. In embodiments, the information from pressure readers 102, flow rate readers 104, and/or temperature readers 108 (e.g., gauges, sensors, transducers, etc.) are used to determine whether high-pressure source 110 or high-pressure source 112 are providing natural gas through the one or more piping sections at or above a minimum threshold pressure, flow rate level, and/or temperature.

In a non-limiting example, high-pressure source 110 (e.g., a tank with high-pressure natural gas) is connected to the piping (piping section 105). Computing device 119 has sent electronic communications to valves v1, v2, v3, and v7 to be open, and control valve c1 and non-return valve 106 (located on piping section 105) to be open for natural gas flow from high-pressure source 110 into the piping sections 105, 113, and 115. While natural gas is flowing from high-pressure source 110, pressure reader 102, flow rate reader 104, and temperature reader 108 (on piping section 105) may read pressure, flow rates, and temperatures respectively (e.g., via sensors). The pressure, flow rate, and/or temperature information is then sent electronically to computing device 119. The electronic information may be sent via wire (e.g., fiber optic lines, telecommunication lines) or wirelessly (e.g., cellular system, satellite system, etc.) to computing device 119.

Based on the electronic information, computing device 119 may determine whether to continue to allow natural gas to flow from high-pressure source 110 or provide natural gas from high-pressure source 112. This determination is based on whether the natural gas flowing through the piping sections is at a particular pressure level, flow rate level, and/or temperature level (e.g., threshold levels). Thus, the pressure level, flow rate level, and/or temperature level information is provided in the electronic information and determines whether high-pressure source 110 can provide natural gas at the threshold pressure, flow rate levels, and temperature.

If computing device 119 determines (based on the electronic information) that natural gas should continue to flow from high-pressure source 110 through the one or more piping sections, then valves v1, v2, v3, and v7 remain open, as well as control valve c1 and non-return valve 106 (located on piping section 105). If computing device 119 determines (based on the electronic information) that natural gas should not continue to flow from high-pressure 110, then computing device 119 may send electronic communications (e.g., wired or wirelessly) to close one or more of valves v1, v2, and v3, as well as control valve c1 and non-return valve 106 (located on piping section 105).

In this non-limiting example, computing device 119 may then determine that natural gas should be sent from high-pressure source 112 via piping sections 107, 117, and 115. To do so, computing device 119 may send electronic communications to v8, v9, and v10 to be open as well as control valve c2 and non-return valve 106 (located on piping section 107). In embodiments, computing device 119 may open valves v8 and v9 first to determine whether high-pressure source 112 has natural gas at a required pressure and/or flow rate. In embodiments, v7 may always stay open or may be closed and then opened during switchover from one high-pressure source to another. Thus, natural gas may flow from high-pressure source 112 to the customer's system. In embodiments, the customer's system may be a pipeline of natural gas that is used within a natural gas distribution system, a utility, and/or a commercial/industrial client (e.g., hospital, food processing company, etc.). Pressure reader 102, flow rate reader 104, and temperature reader 108, located on piping section 107, may read pressure and flow rate of the natural gas flowing through piping section 107 to determine whether the natural gas is flowing at or above a particular threshold pressure and/or flow rate.

If the natural gas flows at or above the particular threshold pressure, flow rate, and/or temperature levels, based on electronic information sent from pressure reader 102 and flow rate reader 104 (located on piping section 107), then v8, v9, v10, and v7, as well as control valve c2 and non-return valve 106 remains open. In embodiments, electronic information from pressure reader 102 and flow rate reader 104 (on piping section 107) may be sent to computing device 119 which determines whether high-pressure source 112 has the threshold pressure, flow rate, and temperature. If high-pressure source 112 no longer has sufficient natural gas supply, all valves may be closed. Alternatively, high-pressure source 112 may switch over high-pressure source 110 again if a new tank has been installed (i.e., a new tank as high pressure source 110).

In another non-limiting example, computing device 119 may determine, based on electronic information from pressure reader 102 and flow rate reader 104 (located on piping section 105) that a change in the pressure and/or flow rate indicates that there is a problem with piping section 105 itself (e.g., leak), valves v2, v3, control valve c1, and/or non-return valve 106 (on piping section 105). The problem may be associated with a loss of pressure, flow rate, and/or change in temperature when compared to (1) a time when natural gas began to be provided from high-pressure source 110, (2) a particular change in pressure readings within a particular amount of time (e.g., drop of pressure from 4,000 PSIG to 2,500 PSIG within 30 minutes, one hour, etc.), (3) a particular change in flow rate readings within a particular amount of time, and/or (4) a particular change in temperature readings within a particular amount of time.

Based on determining that there is a problem with one or more valves on piping section 105 and/or piping section 105 itself (after v2), computing device 119 may close various valves by sending one or more communications to valves, v3, control valve c1, and/or non-return valve 106 (on piping section 105). In addition computing device 119 may send an electronic communication and open valves v4, v6, and non-return valve 106 (on piping section 111) and allow the natural gas from high-pressure source 110 to send natural gas through piping sections 105, 109, 111, and 115. In embodiments, valve v2 is kept open so that pressure readings can be determined for the gas flowing out of high-pressure source 110. Thus, when the pressure readings are below a threshold, computing device 119 can send electronic communications to switch from high-pressure source 110 to high pressure 112. In alternate embodiments, a flow rate reader 104 and/or temperature reader 108 may be located between v1 and v2 and may be able to read flow rates and/or temperature information about high-pressure source 110 and send this information to computing device 119 in determining to switch from high-pressure source 110 to 112.

In another non-limiting example, computing device 119 may determine, based on electronic information from pressure reader 102 and flow rate reader 104 (located on piping section 107) that there is change in the pressure, flow rate, and/or temperature that indicates that there is a problem with piping section 107 itself (e.g., leak), valves v10, control valve c2, and/or non-return valve 106 (on piping section 107). The problem may be associated with a loss of pressure and/or high flow rate, and/or a temperature change when compared to (1) a time when natural gas began to be provided from high-pressure source 112, (2) a particular change in pressure readings within a particular amount of time (e.g., drop of pressure from 4,000 PSIG to 2,500 PSIG within 30 minutes, one hour, etc.), (3) a particular change in flow rate readings within a particular amount of time, and/or (4) a particular change in temperature readings within a particular amount of time.

Based on a determination that there is a problem with one or more valves on piping section 107 and/or piping section 107 itself (after v9), computing device 119 may close various valves by sending one or more communications to valves v10, control valve c2, and/or non-return valve 106 (on piping section 107). In addition computing device 119 may send an electronic communication and open valves v5, v6, and non-return valve 106 (on piping section 111) and allow the natural gas from high-pressure source 112 to send natural gas through piping section 109 to piping section 111 and then onto piping section 115. In embodiments, valve v9 (on piping section 107) is kept open so that pressure readings, can be determined for the gas flowing out of high-pressure source 112. Thus, when the pressure readings are at or below the threshold, computing device 119 can send electronic communications to switch over from high-pressure source 112 to high pressure source 110. In alternate embodiments, a flow rate reader 104 and/or temperature reader 108 may be located between v8 and v9 and may be able to read flow rates and/or temperature information about high-pressure source 112 and this send information to computing device 119 in determining to switch from high-pressure source 112 to 110.

In another non-limiting example, computing device 119 has switched over from high-pressure source 110 to high-pressure source 112. At a particular time, both high-pressure sources may not have the particular threshold levels that are required to supply natural gas to a customer whose system is connected to system 300. In alternate embodiments, the threshold levels may be dynamic, rather than static, and may change based on an end-user's requirements. For example, an end-user's requirements may change from 500 to 300 PSIG gas and a high-pressure source may have 400 PSIG pressure available. Accordingly, the updated pressure threshold may be used by computing device to determine to continue using the same high-pressure source without any change over. Thus, no changeover may occur as the high-pressure source has pressure above the updated pressure requirement.

Based on the final pressure, flow rate, and/or temperature readings on piping section 105 and on piping section 107, computing device 119 may determine that a combination of natural gas being supplied from both high-pressure sources 110 and 112 will meet the threshold levels that are required to supply natural gas to a customer whose system is connected to system 300. Accordingly, computing device 119 may open valves v4 and v5 (by sending electronic communications to v4 and v5) while closing control valves c1 and c2. As a result, natural gas from high-pressure sources 110 and 112 may mix and flow through piping sections 111 and 115. In this non-limiting example, non-return valve 106 (on piping section 111) is also open (via electronic communications from computing device 119). In embodiments, valve v2 and/or v5 is opened so that the combined pressure information can be detected by pressure reader 102 (on piping section 105 and/or 107) to determine how much combined natural gas is flowing through system 300. Accordingly, control valves c1 and c2 are closed and, thus, no natural gas enters v7 from piping section 105 and 107. While valve v2 is open, valve v9 may be open or closed. If open, pressure reader 102 (on piping section 107) may also analyze pressure information along with the pressure being read along piping section 105. In embodiments, pressure information from piping sections 105 and 107 may be compared to each other to determine the accuracy of the pressure information (e.g., are both readings within a particular range, such as within 0.5%, 0.9%, etc.). In this non-limiting example, valves v4 and v5 are open.

Figure 4:
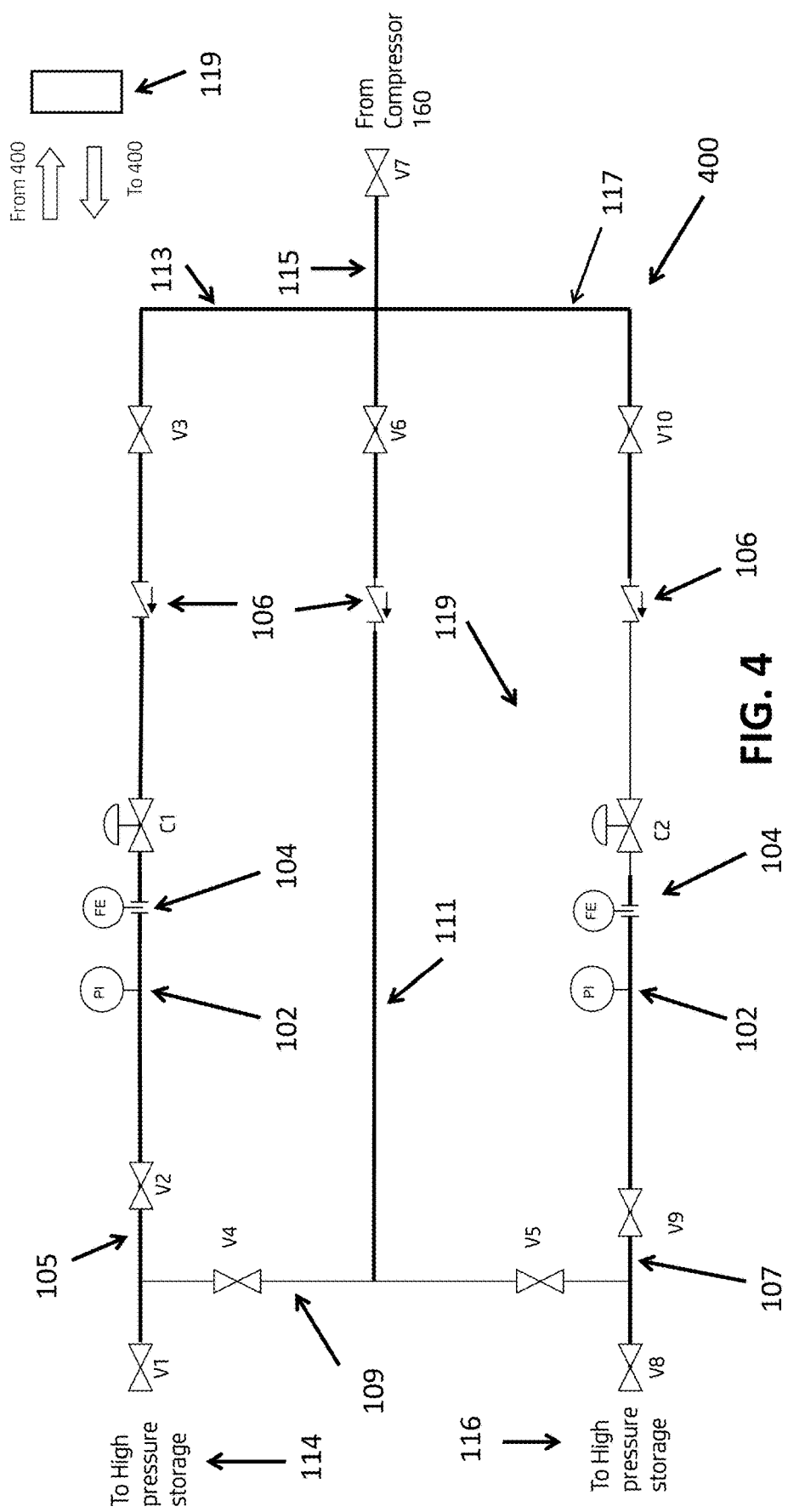

FIG. 4 is an example schematic diagram of an automatic changeover process that permits filling one or more high-pressure tanks from compressor 160 via one or more piping sections and different types of valves. As shown in FIG. 4, system 400 includes pressure readers 102, flow rate readers 104, non-return valves 106, control valves c1 and c2, and valves v1, v2, v3, v4, v5, v6, v7, v8, v9, and v10. In addition, FIG. 4 also shows computing device 119 and high-pressure storage 114 and 116. FIG. 4 also shows piping sections 105, 107, 109, 111, 113, 115, and 117. In embodiments, any of the piping sections may be separate piping connected together (e.g., connectors, welding, etc.). Alternatively, the piping sections may be all part of one or more piping runs (e.g., 105 and 113 may be one continuous piece of pipe). In embodiments, within each of the piping sections, valves may be installed, such as control valves, valves, and non-return vales. In embodiments, pressure readers and flow rate readers may be attached to one or more of the piping sections to read pressure and flow rates.

In embodiments, based on information received from pressure readers 102 and flow rate readers 104, computing device 119 may determine which of valves v1, v2, v3, v4, v5, v6, v7, v8, v9, and v10 should be open and which should be closed. In embodiments, the information from pressure readers 102 and flow rate readers 104 determine whether high-pressure storage 114 or high-pressure storage 116 should receive natural gas through one or more piping sections based on when a threshold pressure and/or flow rate level is reached. In embodiments, system 400 may be system 200 but is being used to fill high-pressure tanks rather than distributing natural gas from one or more high-pressure tanks (e.g., sources) such as described in FIG. 2. Thus, the non-return valves 106 may be reversed to allow the high-pressure sources to receive natural gas. In embodiments, high-pressure storage 114 may be similar to high-pressure source 110 and high-pressure storage 116 may be similar to high-pressure source 112.

In a non-limiting example, high-pressure storage 114 (e.g., a tank with high-pressure natural gas) is connected to piping section 105. Computing device 119 has sent electronic communications to valves v1, v2, v3, and v7 to be open, and control valve c1 and non-return valve 106 (located on piping section 105) to be open for natural gas flow to be sent to high-pressure storage 114 via piping sections 105, 113, and 115. While natural gas is flowing to high-pressure storage 114, pressure reader 102 and flow rate reader 104 may read pressure and flow rates, respectively (e.g., via sensors). The pressure and flow rate information is electronically sent to computing device 119. The electronic information may be sent via wire (e.g., fiber optic lines, telecommunication lines) or wirelessly (e.g., cellular system, satellite system, etc.) to computing device 119.

Based on the electronic information, computing device 119 may determine whether to continue to allow natural gas to flow to high-pressure storage 114 or provide natural gas to high-pressure storage 116. This determination is based on whether the natural gas is at a particular pressure level in the piping sections and/or a high-pressure tank; and/or flow rate level is at a particular level within one or more piping sections (e.g., threshold levels). The pressure level and flow rate level information is provided in the electronic information and determines whether high-pressure storage 114 has reached a threshold pressure.

If computing device 119 determines (based on the electronic information) that natural gas should continue to flow to high-pressure storage 114 through the one or more piping sections, then valves v1, v2, v3, and v7 remain open, as well as control valve c1 and non-return valve 106 (located on piping section 105). If computing device 119 determines (based on the electronic information) that natural gas should not continue to supply to high-pressure storage 114, then computing device 119 may send electronic communications (e.g., wired or wirelessly) to valves v1, v2, and v3, as well as control valve c1 and non-return valve 106 (located on piping section 105) to close.

In this non-limiting example, computing device 119 may then determine that natural gas should be sent to high-pressure storage 116 via piping sections 107, 117, and 115. To do so, computing device 119 may send electronic communications to v8, v9, and v10 to be open as well as control valve c2 and non-return valve 106 (located on piping section 107). In embodiments, computing device 119 may open valves v8 and v9 first to determine whether high-pressure storage 116 is below a particular pressure and/or flow rate (e.g., low pressure and/or no flow). In embodiments, v7 may always stay open or may be closed and then opened during switchover from one high-pressure source to another. Thus, natural gas may flow to high-pressure storage 116. Pressure reader 102 and flow rate reader 104, located on piping section 107, may read pressure and flow rate of the natural gas flowing through piping section 107 to determine whether the natural gas is at a particular threshold pressure and/or flow rate. If the natural gas flows at the particular threshold pressure and/or flow rate levels, based on electronic information sent from pressure reader 102 and flow rate reader 104 (located on piping section 107), then v8, v9, and v10, as well as control valve c2 and non-return valve 106 remain open.

In another non-limiting example, computing device 119 may determine, based on electronic information from pressure reader 102 and flow rate reader 104 (located on piping section 105) that there is a change in the pressure and/or flow rate that indicates that there is a problem with piping section 105 itself (e.g., leak), valves v2, v3, control valve c1, and/or non-return valve 106 (on piping section 105). The problem may be associated with a loss of pressure and/or change in flow rate when compared to (1) a time when natural gas began to be provided to high-pressure storage 114, (2) a particular change in pressure readings within a particular amount of time (e.g., drop of pressure from 4,000 PSIG to 3,000 PSIG within 30 minutes, one hour, etc.), and/or (3) a particular change in flow rate readings within a particular amount of time.

Based on determining that there is a problem with one or more valves on piping section 105 and/or piping section 105 itself (before or after v2), computing device 119 may close various valves by sending one or more communications to valves, v2, v3, control valve c1, and/or non-return valve 106. In addition computing device 119 may send an electronic communication and open valves v4, v6, and non-return valve 106 (on piping section 111) and allow the natural gas to high-pressure storage 114 to send natural gas through piping sections 105, 109, 111, and 115. In embodiments, c1 and non-return valve 106 (on piping section 105) are closed but v2 is kept open so that pressure readings can be determined for the gas flowing out to high-pressure storage 114. Thus, when the pressure readings are at or above a threshold level, computing device 119 can send electronic communications to switch from high pressure storage 114 to high-pressure storage 116. In alternate embodiments, a flow rate reader 104 and/or temperature 108 may be located between v1 and v2 and may be able to read flow rates and/or temperature information about high-pressure storage 114 and send this information to computing device 119 in determining to switch from high-pressure storage 114 to 116.

In another non-limiting example, computing device 119 may determine, based on electronic information from pressure reader 102 and flow rate reader 104 (located on piping section 107) that there is change in the pressure and/or flow rate that indicates that there is a problem with piping section 107 itself (e.g., leak), valves v9, v10, control valve c2, and/or non-return valve 106 (on piping section 107). The problem may be associated with a loss of pressure and/or flow rate when compared to (1) a time when natural gas began to be provided to high-pressure storage 116, (2) a particular change in pressure readings within a particular amount of time (e.g., drop of pressure from 4,000 PSIG to 3000 PSIG within 30 minutes, one hour, etc.), and/or (3) a particular change in flow rate readings within a particular amount of time.

Based on determining that there is a problem with one or more valves on piping section 107 and/or a part of piping section 107 (after v9), computing device 119 may close various valves by sending one or more communications to valves, v9, v10, control valve c2, and/or non-return valve 106 (on piping section 107). In addition computing device 119 may send an electronic communication and open valves v5, v6, and non-return valve 106 (on piping section 111) and allow the natural gas to be sent to high-pressure storage 116 through piping sections 107, 109, 111, and 115. In embodiments, c2 and non-return valve 106 (on piping section 107) are closed but v9 is kept open so that pressure readings can be determined for the gas flowing out to high-pressure storage 116. Thus, when the pressure readings are at or above a threshold level, computing device 119 can send electronic communications to switch from high-pressure storage 116 to high-pressure storage 114. In alternate embodiments, a flow rate reader 104 may be located between v8 and v9 and may be able to read flow rate information about high-pressure storage 116 and send the information to computing device 119 in determining to switch from high-pressure storage 116 to 114.

Figure 5:
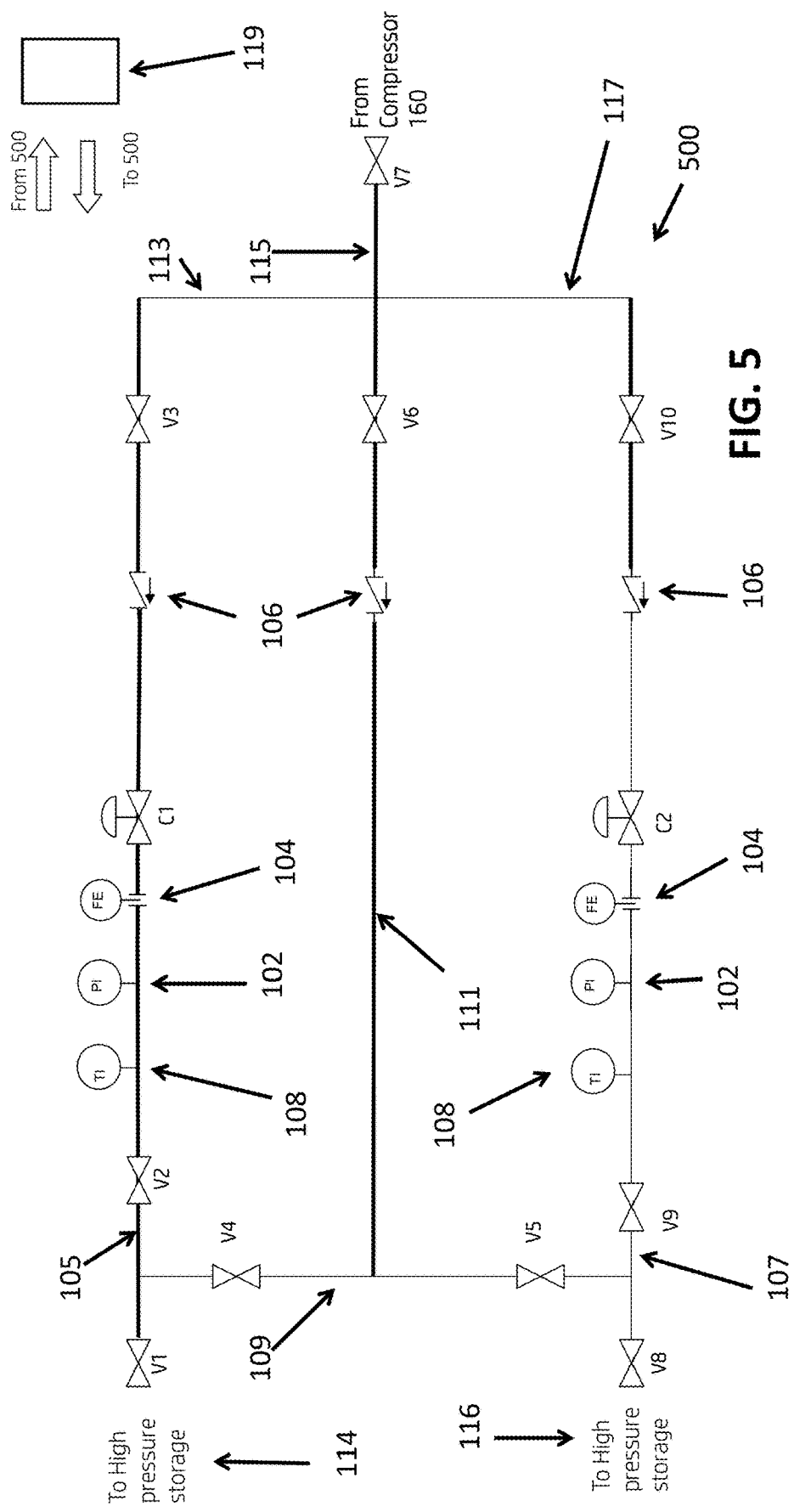

FIG. 5 is an example schematic diagram of an automatic changeover process that permits filling one or more high-pressure tanks (e.g., high-pressure storage 114 and 116) from compressor 160 via one or more piping sections and different types of valves. As shown in FIG. 5, system 500 includes pressure readers 102, flow rate readers 104, non-return valves 106, control valves c1 and c2, and valves v1, v2, v3, v4, v5, v6, v7, v8, v9, and v10. In addition, FIG. 5 also shows computing device 119 and high-pressure storage 114 and 116. FIG. 5 also shows piping sections 105, 107, 109, 111, 113, 115, and 117. In embodiments, any of the piping sections may be separate piping connected together (e.g., connectors, welding, etc.). Alternatively, the piping sections may be all part of one or more piping runs (e.g., 105 and 113 may be one continuous piece of pipe). In embodiments, within each of the piping sections, valves may be installed, such as control valves, valves, and non-return valves. In embodiments, pressure, temperature readers, and flow rate readers may be attached to one or more of the piping sections to read the pressure, temperature and flow rates.

In embodiments, based on information received from pressure readers 102 and flow rate readers 104, computing device 119 may determine which of valves v1, v2, v3, v4, v5, v6, v7, v8, v9, and v10 should be open and which should be closed. In embodiments, the information from pressure readers 102, flow rate readers 104, and temperature readers 108 determine whether high-pressure storage 114 or high-pressure storage 116 should receive natural gas through the one or more piping sections based on when a threshold pressure, flow rate level, and/or temperature reading is within particular parameters. In embodiments, system 500 may be system 300 but is being used to fill high-pressure tanks rather than distributing natural gas from one or more high-pressure tanks as described in FIGS. 2 and 3. In addition, the non-return valves 106 may be reversed in FIG. 300 to allow the high-pressure sources to receive natural gas as described in FIG. 5.

In a non-limiting example, high-pressure storage 114 (e.g., a tank with high-pressure natural gas) is connected to piping section 105. Computing device 119 has sent electronic communications to valves v1, v2, v3, and v7 to be open, and control valve c1 and non-return valve 106 (located on piping section 105) to be open for natural gas flow to be sent to high-pressure storage 114 via piping sections 105, 113, and 115. While natural gas is flowing to high-pressure storage 114, pressure reader 102, flow rate reader 104, and temperature reader 108 may read pressure, flow rates, and temperatures respectively (e.g., via sensors). The pressure and flow rate information is electronically sent to computing device 119. The electronic information may be sent via wire (e.g., fiber optic lines, telecommunication lines) or wirelessly (e.g., cellular system, satellite system, etc.) to computing device 119.

Based on the electronic information, computing device 119 may determine whether to continue to allow natural gas to flow to high-pressure storage 114 or provide natural gas to high-pressure storage 116. This determination is based on whether the natural gas is at a particular pressure and temperature level in the piping sections and/or a high-pressure tank; and/or flow rate level is at a particular level within one or more piping sections (e.g., threshold levels). The pressure level and flow rate level information is provided in the electronic information and determines whether high-pressure storage 114 has reached a threshold pressure.

If computing device 119 determines (based on the electronic information) that natural gas should continue to flow to high-pressure storage 114 through the one or more piping sections, then valves v1, v2, v3, and v7 remain open, as well as control valve c1 and non-return valve 106 (located on piping section 105). If computing device 119 determines (based on the electronic information) that natural gas should not continue to be supplied to high-pressure storage 114, then computing device 119 may send electronic communications (e.g., wired or wirelessly) to valves v1, v2, and v3, as well as control valve c1 and non-return valve 106 (located on piping section 105) to close.

In this non-limiting example, computing device 119 may then determine that natural gas should be sent to high-pressure storage 116 via piping sections 107, 117, and 115. To do so, computing device 119 may send electronic communications to v8, v9, and v10 to be open as well as control valve c2 and non-return valve 106 (located on piping section 107). In embodiments, computing device 119 may open valves v8 and v9 first to determine whether high-pressure storage 116 is below a particular pressure and/or flow rate (e.g., low pressure and/or no flow). In embodiments, v7 may always stay open or may be closed and then opened during switchover from one high-pressure source to another. Thus, natural gas may flow to high-pressure storage 116. Pressure reader 102 and flow rate reader 104, located on piping section 107, may read pressure and flow rate of the natural gas flowing through piping section 107 to determine whether the natural gas is at or above a particular threshold pressure and/or flow rate. If the natural gas flows at the particular threshold pressure and/or flow rate levels, based on electronic information sent from pressure reader 102, flow rate reader 104, and temperature reader 108 (located on piping section 107), then v8, v9, and v10, as well as control valve c2 and non-return valve 106 remain open.

In another non-limiting example, computing device 119 may determine, based on electronic information from pressure reader 102, flow rate reader 104, and temperature reader 108 (located on piping section 105) that there is a change in the pressure, flow rate, and/or temperature that indicates that there is a problem with piping section 105 itself (e.g., leak), valves v2, v3, control valve c1, and/or non-return valve 106 (on piping section 105). The problem may be associated with a loss of pressure, loss in flow rate, and/or change in temperature when compared to (1) a time when natural gas began to be provided to high-pressure storage 114, (2) a particular change in pressure readings within a particular amount of time (e.g., drop of pressure from 4,000 PSIG to 3000 PSIG within 30 minutes, one hour, etc.), (3) a particular change in flow rate readings within a particular amount of time; and/or (4) a change in temperature readings within a particular amount of time (e.g., a drop of 20 degrees F. within five seconds).

Based on determining that there is a problem with one or more valves on piping section 105 and/or piping section 105 itself (after v2), computing device 119 may close various valves by sending one or more communications to valves, v2, v3, control valve c1, and/or non-return valve 106. In addition computing device 119 may send an electronic communication and open valves v4, v6, and non-return valve 106 (on piping section 111) and allow the natural gas to high-pressure storage 114 to send natural gas through piping sections 105, 109, 111, and 115. In embodiments, c1 and non-return valve 106 (on piping section 105) are closed but v2 is open so that pressure readings can be determined for the gas flowing out of high-pressure storage 114. Thus, when the pressure readings are below a threshold, computing device 119 can send electronic communications to switch from high-pressure storage 114 to high pressure storage 116. In alternate embodiments, a flow rate reader 104 and/or temperature reader 108 may be located between v1 and v2 and may be able to read flow rate and/or temperature information about high-pressure storage 114 and send this information to computing device 119 in determining to switch from high-pressure storage 114 to 116.

In another non-limiting example, computing device 119 may determine, based on electronic information from pressure reader 102 and flow rate reader 104 (located on piping section 107) that there is a change in the pressure and/or flow rate that indicates that there is a problem with piping section 107 itself (e.g., leak), valves v9, v10, control valve c2, and/or non-return valve 106 (on piping section 107). The problem may be associated with a loss of pressure and/or flow rate when compared to (1) a time when natural gas began to be provided to high-pressure storage 116, (2) a particular change in pressure readings within a particular amount of time (e.g., drop of pressure from 4,000 PSIG to 2,500 PSIG within 30 minutes, one hour, etc.), (3) a particular change in flow rate readings within a particular amount of time, and/or (4) a change in temperature readings within a particular amount of time (e.g., a drop of 20 degrees F. within five seconds).

Based on determining that there is a problem with one or more valves on piping section 107 and/or piping section 107 itself (before or after v9), computing device 119 may close various valves by sending one or more communications to valves, v9, v10, control valve c2, and/or non-return valve 106 (on piping section 107). In addition computing device 119 may send an electronic communication and open valves v5, v6, and non-return valve 106 (on piping section 111) and allow the natural gas to be sent to high-pressure storage 116 through piping sections 107, 109, 111, and 115. In embodiments, c2 and non-return valve 106 (on piping section 107) are closed but v9 is kept open so that pressure, readings can be determined for the gas flowing out to high-pressure storage 116. Thus, when the pressure readings are below a threshold, computing device 119 can send electronic communications to switch from high-pressure storage 116 to high-pressure storage 114. In alternate embodiments, a flow rate reader 104 and/or temperature 108 may be located between v8 and v9 and may be able to read flow rates and/or temperature information about high-pressure storage 116 and send this information to computing device 119 in determining to switch from high-pressure storage 116 to 114.

Figure 6:
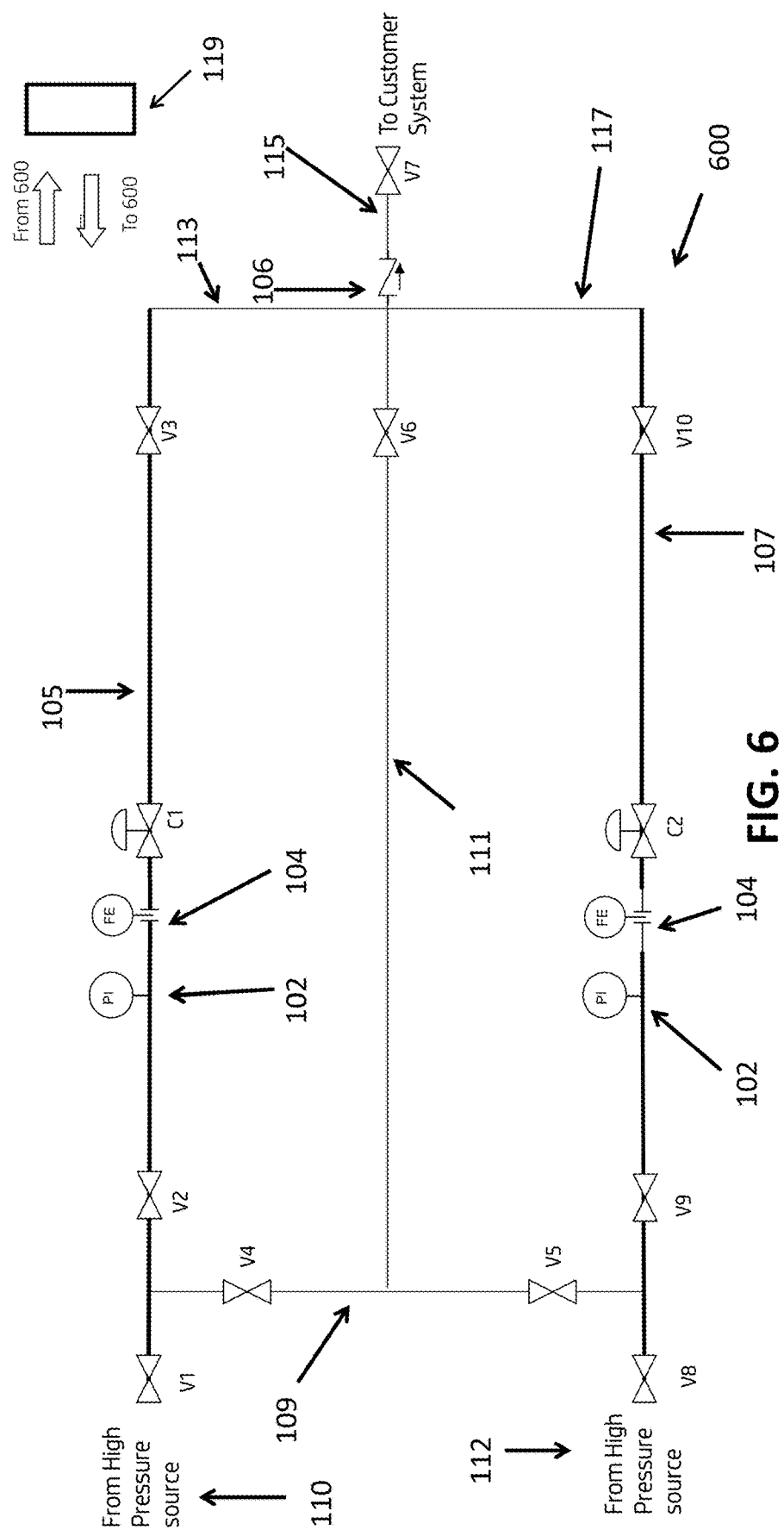

FIG. 6 is an example schematic diagram of an automatic changeover process that permits the discharge of natural gas from a high-pressure source (e.g., a tank) into a piping system. As shown in FIG. 6, system 600 includes pressure readers 102, flow rate readers 104, non-return valve 106, control valves c1 and c2, and valves v1, v2, v3, v4, v5, v6, v7, v8, v9, and v10. In addition, FIG. 6 also shows computing device 119 and high-pressure sources 110 and 112. FIG. 2 also shows piping sections 105, 107, 109, 111, 113, 115, and 117. In embodiments, any of the piping sections may be separate piping connected together (e.g., connectors, welding, etc.). Alternatively, the piping sections may be all part of one or more piping runs (e.g., 105 and 113 may be one continuous piece of pipe). In embodiments, within each of the piping sections, valves may be installed, such as control valves, valves, and non-return vales. In embodiments, pressure readers and flow rate readers may be attached to one or more of the piping sections to read temperature and flow rates.

In embodiments, based on information received from pressure readers 102 and flow rate readers 104, computing device 119 may determine which of valves v1, v2, v3, v4, v5, v6, v7, v8, v9, and v10 should be open and which should be closed. In embodiments, the information from pressure readers 102 and flow rate readers 104 determine whether high-pressure source 110 or high-pressure source 112 are providing natural gas through the one or more piping sections at a threshold pressure and/or flow rate level.

As shown in FIG. 6, the difference between FIG. 2 and FIG. 6 is that FIG. 6 shows only one non-return valve 106 on piping section 115 and which is after valve v6 whereas FIG. 2 shows non-return valve 106 on piping section 111 and before valve v6. Thus, FIG. 6 shows a non-return valve 106 that is placed on a location which is on piping section 115 such that it can be used to prevent any issues that may occur in any of the other valves, piping sections, and/or high-pressure sources. For example, by placing only one non-return valve 106, costs may be reduced. In addition, removing non-return valve 106 from piping sections 105, 111, and/or 117 may reduce pressure differential that may occur when natural gas is first entering the system. Thus, while the features in FIG. 6 may perform one or more of the example processes described in FIG. 2, FIG. 6 shows a non-return valve that can be used to result in natural gas to flow in only one direction whether the natural gas enters into non-return 106 (on piping section 115) from piping sections 105, 107, 111, 113, and 117

In a non-limiting example, high-pressure source 110 (e.g., a tank with high-pressure natural gas) is connected to the piping (piping section 105). Computing device 119 has sent electronic communications to valves v1, v2, v3, and v7 to be open, and control valve c1 and non-return valve 106 to be open for natural gas flow from high-pressure source 110 into the piping sections 105, 113, and 115. While natural gas is flowing from high-pressure source 110, pressure reader 102 and flow rate reader 104 (on piping section 105) may read pressure and flow rates, respectively (e.g., via sensors). The pressure and flow rate information is then sent electronically to computing device 119. The electronic information may be sent via wire (e.g., fiber optic lines, telecommunication lines) or wirelessly (e.g., cellular system, satellite system, etc.) to computing device 119.

Based on the electronic information, computing device 119 may determine whether to continue to allow natural gas to flow from high-pressure source 110 or provide natural gas from high-pressure source 112. This determination is based on whether the natural gas flowing through the piping sections is at or above a particular pressure level and/or flow rate level (e.g., threshold levels). Thus, the pressure level and flow rate level information is provided in the electronic information and determines whether high-pressure source 110 can provide natural gas at the threshold pressure and flow rate levels.

If computing device 119 determines (based on the electronic information) that natural gas should continue to flow from high-pressure source 110 through the one or more piping sections, then valves v1, v2, v3, and v7 remain open, as well as control valve c1 and non-return valve 106. If computing device 119 determines (based on the electronic information) that natural gas should not continue to flow from high pressure 110, then computing device 119 may send electronic communications (e.g., wired or wirelessly) to close one or more of valves v1, v2, and v3, as well as control valve c1.

In this non-limiting example, computing device 119 may then determine that natural gas should be sent from high-pressure source 112 via piping sections 107, 117, and 115. To do so, computing device 119 may send electronic communications to v8, v9, and v10 to be open as well as control valve c2 and non-return valve 106. In embodiments, computing device 119 may open valves v8 and v9 first to determine whether high-pressure source 112 has natural gas at a required pressure and/or flow rate. In embodiments, v7 may always stay open or may be closed and then opened during switchover from one high-pressure source to another. Thus, natural gas may flow from high-pressure source 112 to the customer's system. In embodiments, the customer's system may be a natural gas pipeline that is used within a natural gas distribution system, a utility, and/or a commercial/industrial client (e.g., hospital, food processing company, etc.). Pressure reader 102 and flow rate reader 104, located on piping section 107, may read pressure and flow rate of the natural gas flowing through piping section 107 to determine whether the natural gas is flowing at or above a particular threshold pressure and/or flow rate. If the natural gas flows at the particular threshold pressure and/or flow rate levels, based on electronic information sent from pressure reader 102 and flow rate reader 104 (located on piping section 107), then v8, v9, and v10, as well as control valve c2 and non-return valve 106 remain open. In embodiments, electronic information from pressure reader 102 and flow rate reader 104 (on piping section 107) may be sent to computing device 119 which determines whether high-pressure source 112 has the threshold pressure and flow rate. If high-pressure source 112 no longer has sufficient natural gas supply, all valves may be closed. Alternatively, high-pressure source 112 may switch over high-pressure source 110 again if a new tank has been installed (i.e., a new tank for high-pressure source 110).

In another non-limiting example, computing device 119 may determine, based on electronic information from pressure reader 102 and flow rate reader 104 (located on piping section 105) that a change in the pressure and/or flow rate indicates that there is a problem with piping section 105 itself (e.g., leak), valves v2, v3, and/or control valve c1. The problem may be associated with a loss of pressure and/or high flow rate when compared to (1) a time when natural gas began to be provided from high-pressure source 110, (2) a particular change in pressure readings within a particular amount of time (e.g., drop of pressure from 4,000 PSIG to 2,500 PSIG within 30 minutes, one hour, etc.), and/or (3) a particular change in flow rate readings within a particular amount of time.

Based on determining that there is a problem with one or more valves on piping section 105 and/or a part of piping section 105 itself (after v2), computing device 119 may close various valves by sending one or more communications to valves, v3, and/or control valve c1. In addition, computing device 119 may send an electronic communication and open valves v4, and v6, and allow the natural gas from high-pressure source 110 to send natural gas through piping sections 105, 109, 111, and 115. In embodiments, valve v2 is kept open so that pressure readings can be determined for the gas flowing out of high-pressure source 110. Thus, when the pressure readings are below a threshold, computing device 119 can send electronic communications to switch from high-pressure source 110 to high pressure 112. In alternate embodiments, a flow rate reader 104 may be located between v1 and v2 and may be able to read flow rate information about high-pressure source 110 and send the information to computing device 119 in determining to switch from high-pressure source 110 to 112.

In another non-limiting example, computing device 119 may determine, based on electronic information from pressure reader 102 and flow rate reader 104 (located on piping section 107) that there is a change in the pressure and/or flow rate that indicates that there is a problem with piping section 107 itself (e.g., leak), valves v10, control valve c2, and/or non-return valve 106 (on piping section 107). The problem may be associated with a loss of pressure and/or flow rate when compared to (1) a time when natural gas began to be provided from high-pressure source 112, (2) a particular change in pressure readings within a particular amount of time (e.g., drop of pressure from 4,000 PSIG to 2,500 PSIG within 30 minutes, one hour, etc.), and/or (3) a particular change in flow rate readings within a particular amount of time.

Based on determining that there is a problem with one or more valves on piping section 107 and/or piping section 107 itself (after v9), computing device 119 may close various valves by sending one or more communications to valves v10, control valve c2, and/or non-return valve 106 (on piping section 107). In addition computing device 119 may send an electronic communication and open valves v5 and v6, and allow the natural gas from high-pressure source 112 to send natural gas through piping section 111 and then onto the piping section 115. In embodiments, valve v2 (on piping section 107) is kept open so that pressure readings can be determined for the gas flowing out of high-pressure source 112. Thus, when the pressure readings are below a threshold, computing device 119 can send electronic communications to switch from high-pressure source 112 to high pressure 110. In alternate embodiments, a flow rate reader 104 may be located between v8 and v9 and may be able to read flow rate information about high-pressure source 112 and send the information to computing device 119 in determining to switch from high-pressure source 112 to 110.

In another non-limiting example, computing device 119 has switched over from high-pressure source 110 to high-pressure source 112. At a particular time, both high-pressure sources may not have the particular threshold levels that are required to supply natural gas to a customer whose system is connected to system 600. In alternate embodiments, the threshold levels may be dynamic, rather than static, and may change based on an end-user's requirements. For example, an end-user's requirements may change from 500 to 300 PSIG gas and a high-pressure source may have 400 PSIG pressure available. Accordingly, the updated pressure threshold may be used by computing device to determine to continue using the same high-pressure source without any change over. Thus, no changeover may occur as the high-pressure source has pressure above the updated pressure requirement.

Based on the final pressure and/or flow rate readings on piping section 105 and on piping section 107, computing device 119 may determine that a combination of natural gas being supplied from both high-pressure sources 110 and 112 will meet the threshold levels that are required to supply natural gas to a customer whose system is connected to system 600 Accordingly, computing device 119 may open valves v4 and v5 (by sending electronic communications to v4 and v5) while closing control valves c1 and c2. As a result, natural gas from high-pressure sources 110 and 112 may mix and flow through piping sections 111 and 115. In embodiments, valve v2 and/or v5 is opened so that the combined pressure information can be detected by pressure reader 102 and flow rate reader 104 (on piping section 105 and/or 107) to determine how much combined natural gas is flowing through system 600. In embodiments, when both pressure sources are providing natural gas, the combination may result in an equalization of the pressure at both high-pressure sources.

Accordingly, control valves c1 and c2 are closed and, thus, no natural gas enters v7 from piping section 105 and 107. While valve v2 is open, valve v9 may be open or closed. If open, pressure reader 102 and flow rate reader 104 (on piping section 107) may also analyze pressure information along with the pressure and flow rate information being read along piping section 105. In embodiments, pressure and flow rate information from piping sections 105 and 107 may be compared to each other to determine the accuracy of the pressure and flow rate information (e.g., are both readings within a particular range, such as within 0.5%, 0.9%, etc.). In this non-limiting example, valves v4 and v5 are open.

Figure 7:
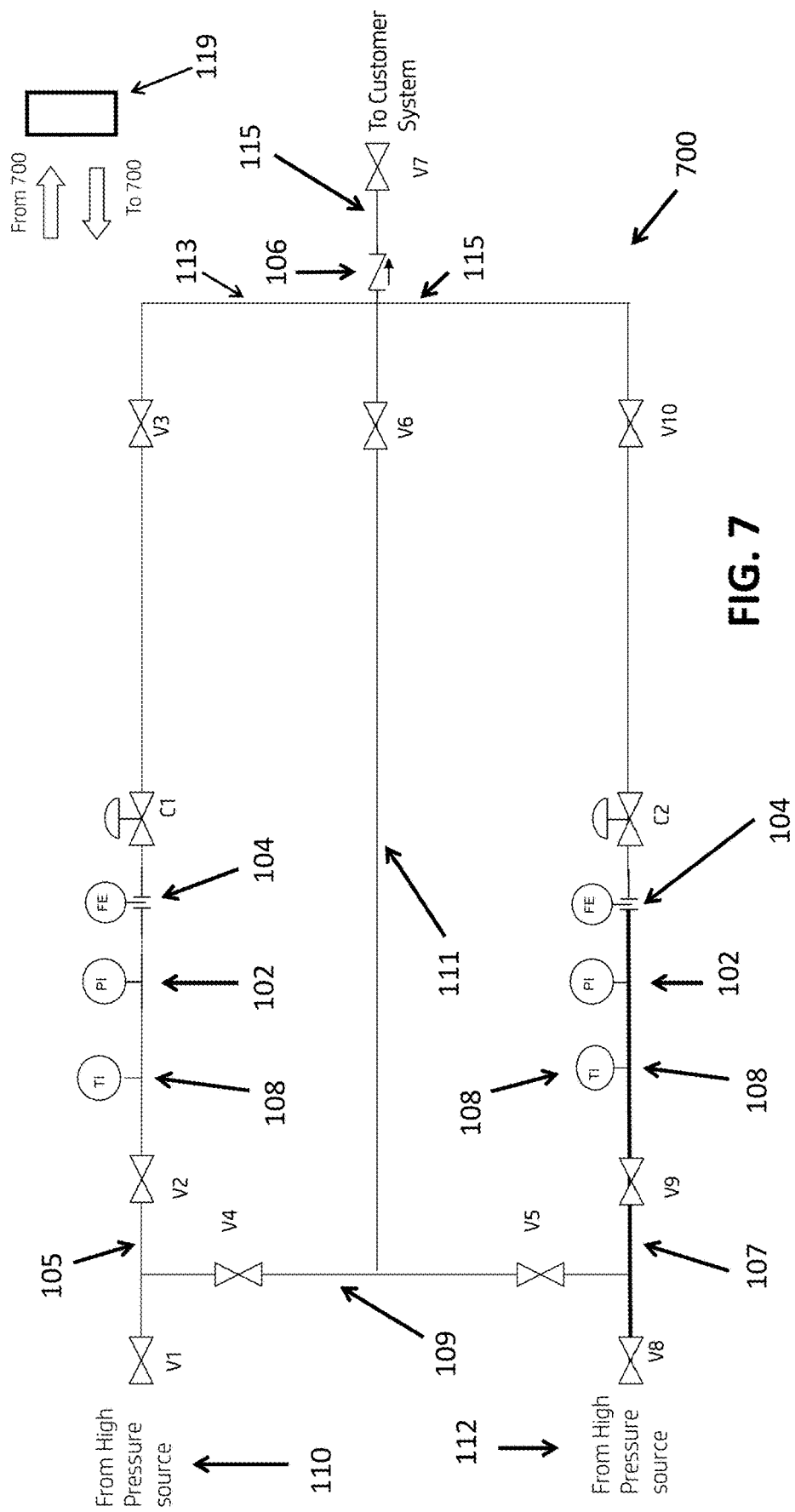

FIG. 7 is an example schematic diagram of an automatic changeover process that permits the discharge of natural gas from a high-pressure source (e.g., a tank) into a piping system. As shown in FIG. 7, system 700 includes pressure readers 102, flow rate readers 104, non-return valve 106, control valves c1 and c2, and valves v1, v2, v3, v4, v5, v6, v7, v8, v9, and v10. In addition, FIG. 7 also shows computing device 119 and high-pressure sources 110 and 112. FIG. 7 also shows piping sections 105, 107, 109, 111, 113, and 115. In embodiments, any of the piping sections may be separate piping connected together (e.g., connectors, welding, etc.). Alternatively, the piping sections may be all part of one or more piping runs (e.g., 105 and 113 may be one continuous piece of pipe). In embodiments, within each of the piping sections, valves may be installed, such as control valves, valves, and non-return vales. In embodiments, pressure readers, temperature readers and flow rate readers may be attached to one or more of the piping sections to read pressure, temperature and flow rates.

In embodiments, based on information received from pressure readers 102 and flow rate readers 104, computing device 119 may determine which of valves v1, v2, v3, v4, v5, v6, v7, v8, v9, and v10 should be open and which should be closed. In embodiments, the information from pressure readers 102 and flow rate readers 104 determine whether high-pressure source 110 or high-pressure source 112 are providing natural gas through the one or more piping sections at a threshold pressure flow rate, and/or temperature level.

As shown in FIG. 7, the difference between FIG. 6 and FIG. 7 is that FIG. 7 also includes temperature readers 108 that also provides temperature information to computing device 119. Thus, the processes described in FIG. 6 are conducted in FIG. 7 but also with the use of temperature information to make decisions (via computing device 119) to turn on particular valves.

Figure 8:
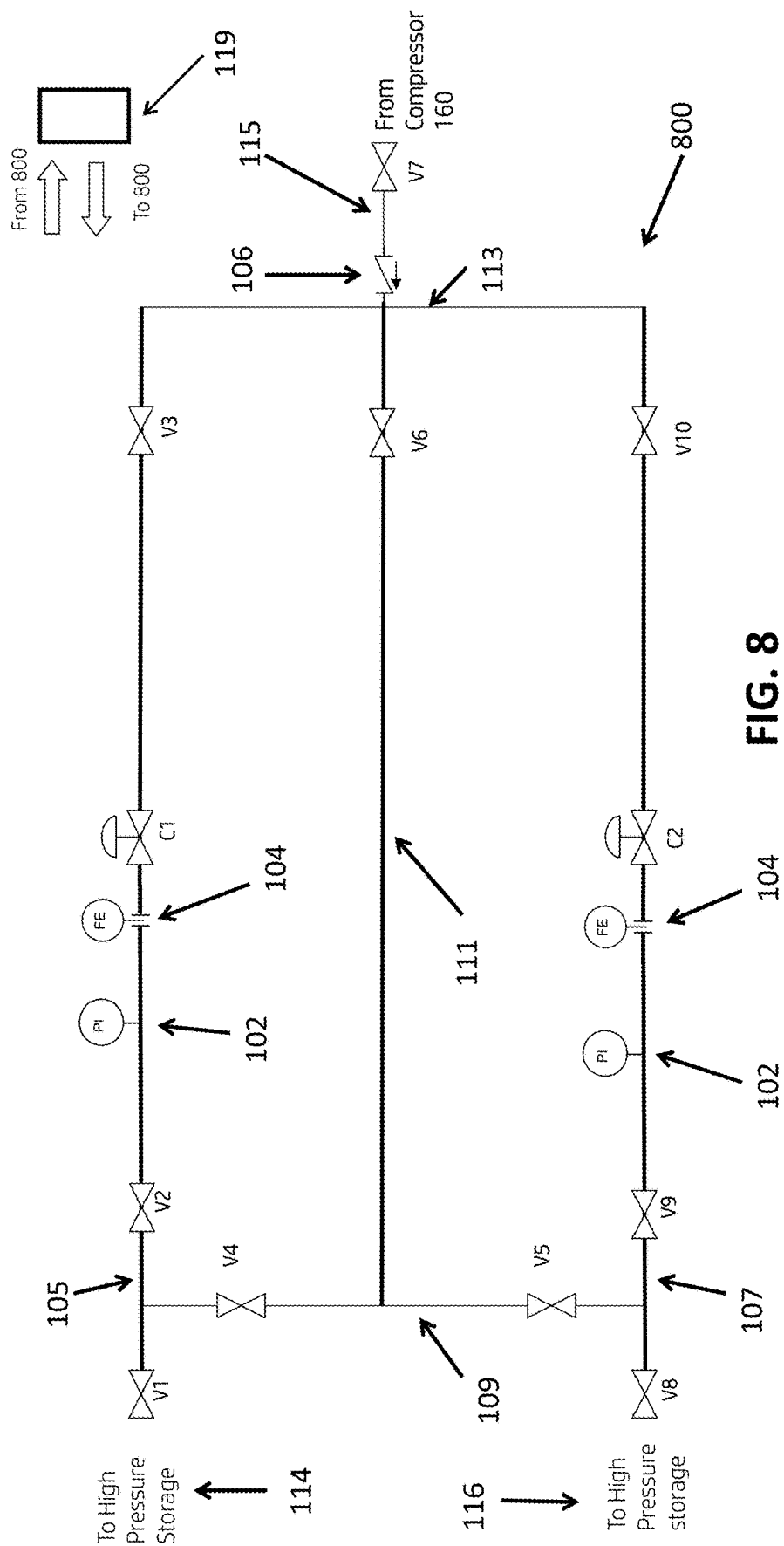

FIG. 8 is an example schematic diagram of an automatic changeover process that permits filling one or more high-pressure tanks from compressor 160 via one or more piping sections and different types of valves. As shown in FIG. 8, system 800 includes pressure readers 102, flow rate readers 104, non-return valve 106, control valves c1 and c2, and valves v1, v2, v3, v4, v5, v6, v7, v8, v9, and v10. In addition, FIG. 8 also shows computing device 119 and high-pressure storage 114 and 116. FIG. 8 also shows piping sections 105, 107, 109, 111, 113, 115, and 117. In embodiments, any of the piping sections may be separate piping connected together (e.g., connectors, welding, etc.). Alternatively, the piping sections may be all part of one or more piping runs (e.g., 105 and 113 may be one continuous piece of pipe). In embodiments, within each of the piping sections, valves may be installed, such as control valves, valves, and non-return valves. In embodiments, pressure readers and flow rate readers may be attached to one or more of the piping sections to read pressure, temperature and flow rates.

In embodiments, based on information received from pressure readers 102 and flow rate readers 104, computing device 119 may determine which of valves v1, v2, v3, v4, v5, v6, v7, v8, v9, and v10 should be open and which should be closed. In embodiments, the information from pressure readers 102 and flow rate readers 104 determine whether high-pressure storage 114 or high-pressure storage 116 should receive natural gas through one or more piping sections based on when a threshold pressure and/or flow rate level is reached. In embodiments, system 800 may be system 600 but is being used to fill high-pressure tanks rather than distributing natural gas from one or more high-pressure sources as described in FIGS. 6 and 7. Thus, the non-return valves 106 may be reversed in FIG. 600 to allow the high-pressure sources to receive natural gas as described in FIG. 8.

As shown in FIG. 8, the difference between FIG. 4 and FIG. 8 is that FIG. 8 shows only one non-return valve 106 which is on piping section 115 and is after valve v6 whereas FIG. 4 shows non-return valve 106 on piping section 111 and before valve v6. Thus, FIG. 8 shows a non-return valve 106 that is placed on a location on piping section 115 such that it can be used to prevent any issues (e.g., pressure differentials) that may occur in any of the other valves, piping sections, and/or high-pressure sources.

In a non-limiting example, high-pressure storage 114 (e.g., a tank with high-pressure natural gas) is connected to piping section 105. Computing device 119 has sent electronic communications to valves v1, v2, v3, and v7 to be open, and control valve c1 and non-return valve 106 to be open for natural gas flow to be sent to high-pressure storage 114 via piping sections 105, 113, and 115. While natural gas is flowing to high-pressure storage 114, pressure reader 102 and flow rate reader 104 may read pressure and flow rates, respectively (e.g., via sensors). The pressure and flow rate information is electronically sent to computing device 119. The electronic information may be sent via wire (e.g., fiber optic lines, telecommunication lines) or wirelessly (e.g., cellular system, satellite system, etc.) to computing device 119.

Based on the electronic information, computing device 119 may determine whether to continue to allow natural gas to flow to high-pressure storage 114 or provide natural gas to high-pressure storage 116. This determination is based on whether the natural gas is at a particular pressure level in the piping sections and/or a high-pressure tank; and/or flow rate level is at a particular level within one or more piping sections (e.g., threshold levels). The pressure level and flow rate level information is provided in the electronic information and determines whether high-pressure storage 114 has reached a threshold pressure.

If computing device 119 determines (based on the electronic information) that natural gas should continue to flow to high-pressure storage 114 through the one or more piping sections, then valves v1, v2, v3, and v7 remain open, as well as control valve c1 and non-return valve 106. If computing device 119 determines (based on the electronic information) that natural gas should not continue to be supplied to high-pressure storage 114, then computing device 119 may send electronic communications (e.g., wired or wirelessly) to valves v1, v2, and v3, as well as control valve c1 to close.

In this non-limiting example, computing device 119 may then determine that natural gas should be sent to high-pressure storage 116 via piping sections 107, 113, and 115. To do so, computing device 119 may send electronic communications to v8, v9, and v10 to be open as well as control valve c2. In embodiments, computing device 119 may open valves v8 and v9 first to determine whether high-pressure storage 116 is below a particular pressure and/or flow rate (e.g., low pressure and/or no flow). In embodiments, v7 may always stay open or may be closed and then opened during switchover from one high-pressure source to another. Thus, natural gas may flow to high-pressure storage 116. Pressure reader 102 and flow rate reader 104, located on piping section 107, may read pressure and flow rate of the natural gas flowing through piping section 107 to determine whether the natural gas is at or below a particular threshold pressure and/or flow rate. If the natural gas flows is below a particular threshold pressure and/or flow rate levels, based on electronic information sent from pressure reader 102 and flow rate reader 104 (located on piping section 107), then v8, v9, v10, and v7, as well as control valve c2 to remain open.

In another non-limiting example, computing device 119 may determine, based on electronic information from pressure reader 102 and flow rate reader 104 (located on piping section 105) that there is a change in the pressure and/or flow rate that indicates that there is a problem with piping section 105 itself (e.g., leak), valves v2, v3, control valve c1, and/or non-return valve 106. The problem may be associated with a loss of pressure and/or flow rate when compared to (1) a time when natural gas began to be provided to high-pressure storage 114, (2) a particular change in pressure readings within a particular amount of time (e.g., drop of pressure from 4,000 PSIG to 2,500 PSIG within 30 minutes, one hour, etc.), and/or (3) a particular change in flow rate readings within a particular amount of time.

Based on determining that there is a problem with one or more valves on piping section 105 and/or piping section 105 itself (after v2), computing device 119 may close various valves by sending one or more communications to valves v3 and/or control valve c1. In addition computing device 119 may send an electronic communication and open valves v4 and v6, and allow the natural gas to high-pressure storage 114 to send natural gas through piping sections 109, 111, 113, and 115. In this non-limiting example, natural gas is not being provided into any of the piping sections to high-pressure storage 116. In embodiments, c1 is closed but v2 is kept open so that pressure readings can be determined for the gas flowing out of high-pressure storage 114. Thus, when the pressure readings are below a threshold, computing device 119 can send electronic communications to switch from high-pressure storage 114 to high-pressure storage 116. In alternate embodiments, a flow rate reader 104 may be located between v1 and v2 and may be able to read flow rate information from high-pressure storage 114 and send this information to computing device 119 in determining to switch from high-pressure storage 114 to 116.

In another non-limiting example, computing device 119 may determine, based on electronic information from pressure reader 102 and flow rate reader 104 (located on piping section 107) that there is a change in the pressure and/or flow rate that indicates that there is a problem with piping section 107 itself (e.g., leak), valves v9, v10, and/or control valve c2. The problem may be associated with a loss of pressure and/or flow rate when compared to (1) a time when natural gas began to be provided to high-pressure storage 116, (2) a particular change in pressure readings within a particular amount of time (e.g., drop of pressure from 4,000 PSIG to 2,500 PSIG within 30 minutes, one hour, etc.), and/or (3) a particular change in flow rate readings within a particular amount of time.

Based on determining that there is a problem with one or more valves on piping section 107 and/or piping section 107 itself (after v9), computing device 119 may close various valves by sending one or more communications to valves v10, and/or control valve c2. In addition, computing device 119 may send an electronic communication and open valves v5 and v6, and allow the natural gas to be sent to high-pressure storage 116 through piping sections 107, 109, 111, and 115. In this non-limiting example, v9 is kept open so that pressure readings can still be determined via pressure reader 102 and flow rate reader 104 on piping section 107. In alternate embodiments, a flow rate reader 104 may be located between v8 and v9 and may be able to read flow rates from high-pressure storage 116 and send information to computing device 119 in determining to switch from high-pressure storage 116 to 114.

Figure 9:
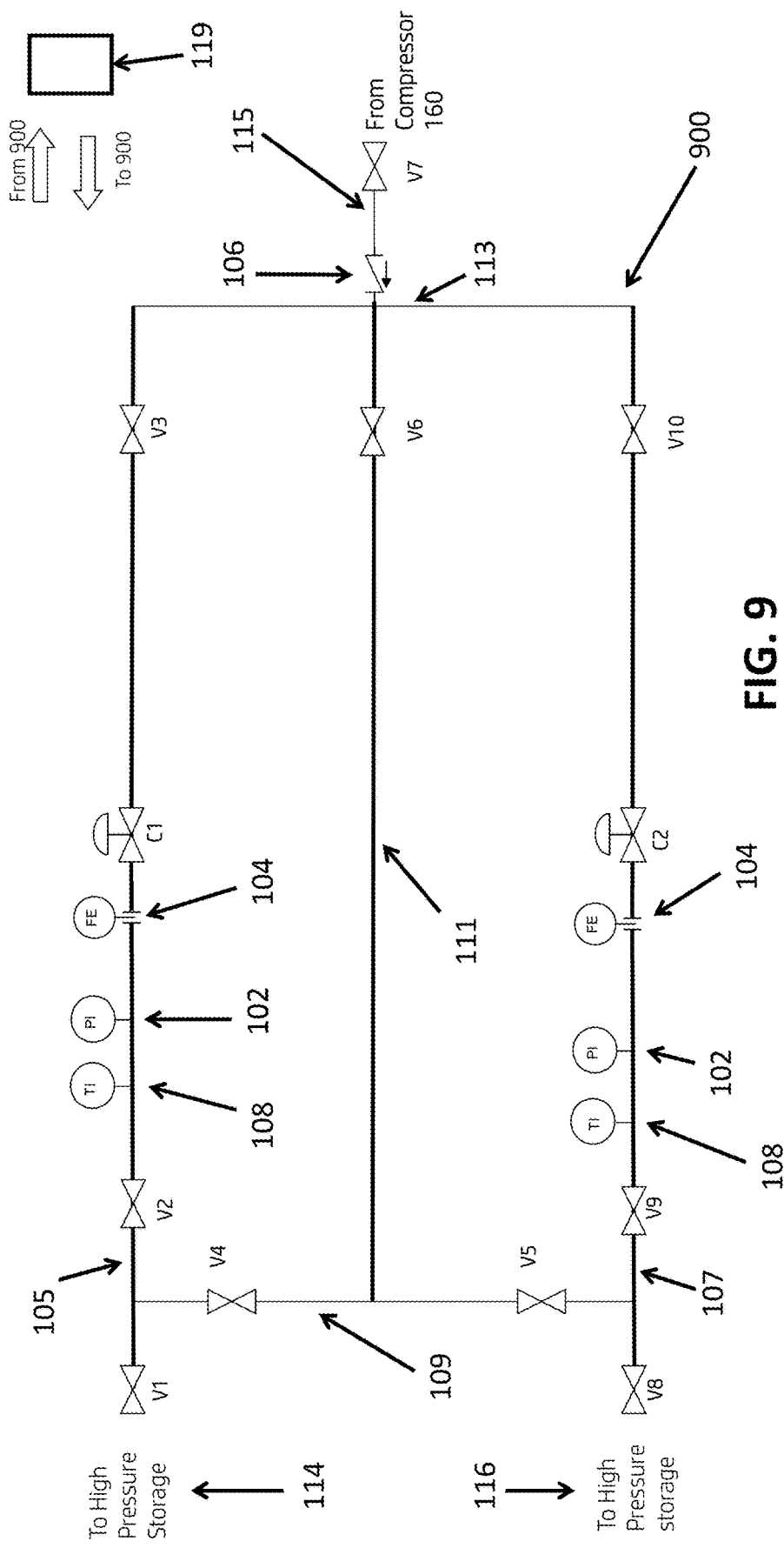

FIG. 9 is an example schematic diagram of an automatic changeover process that permits filling one or more high-pressure tanks from compressor 160 via one or more piping sections and different types of valves. As shown in FIG. 9, a system 900 includes pressure readers 102, flow rate readers 104, non-return valves 106, control valves c1 and c2, and valves v1, v2, v3, v4, v5, v6, v7, v8, v9, and v10. In addition, FIG. 9 also shows computing device 119 and high-pressure sources 114 and 116. FIG. 9 also shows piping sections 105, 107, 109, 111, 113, 115, and 117. In embodiments, any of the piping sections may be separate piping connected together (e.g., connectors, welding, etc.). Alternatively, the piping sections may be all part of one or more piping runs (e.g., 105 and 113 may be one continuous piece of pipe). In embodiments, within each of the piping sections, valves may be installed, such as control valves, valves, and non-return valves. In embodiments, pressure readers and flow rate readers may be attached to one or more of the piping sections to read temperature and flow rates.

In embodiments, based on information received from pressure readers 102 and flow rate readers 104, computing device 119 may determine which of valves v1, v2, v3, v4, v5, v6, v7, v8, v9, and v10 should be open and which should be closed. In embodiments, the information from pressure readers 102, flow rate readers 104, and temperature readers 110 determine whether high-pressure storage 114 or high-pressure storage 116 should receive natural gas through the one or more piping sections based on when a threshold pressure, flow rate level, and/or temperature reading is within particular parameters. In embodiments, system 900 may be system 300 but is being used to fill high-pressure tanks rather than distributing natural gas from one or more high-pressure sources as described in FIGS. 2 and 3. As shown in FIG. 9, the difference between FIG. 8 and FIG. 9 is that FIG. 9 also includes temperature readers 108 which provide temperature information (on the natural gas) to computing device 119. Thus, FIG. 9 may perform one or more of the examples described in FIG. 9 but using temperature information along with pressure and flow rate information to determine which valves should be open or closed.

For FIGS. 2 to 9, at any time computing device 119 detects one or more issues within the example systems, computing device 119 may shut down one or more valves to prevent any natural gas from entering or leaving the system. Also, in FIGS. 2 to 9, computing device 119 may determine that the bypass line (e.g., piping section 111) may not be used as one or more other sections that provide gas directly (e.g., piping section 109) or indirectly (e.g., piping section 105) have issues that are preventing natural gas to flow at a particular rate, pressure, and/or temperature. Also, in FIGS. 2 to 9, any of the valves may be controlled for opening and closing by a computing device (e.g., computing device 119) or may be manually (e.g., mechanically) opened or closed. Furthermore, in FIGS. 2 to 9, any or all of the valves may include an electronic position indicator that can send information to a computing device (e.g., computing device 119). Also, in FIGS. 2 to 9, a pressure reader (e.g., pressure reader 102) may be a type of pressure gauge, sensor, or transducer that may use various technologies such a chemical vapor deposition (CVD) technology, capacitance type, microma-chined silicon (MMS), sputtered thin film type, etc., to obtain pressure information; a temperature reader (e.g., temperature reader 108) may be type of temperature gauge, sensor, or transducer that can sense temperature; and a flow rate reader (e.g., flow rate reader 104) may a type of flow rate gauge, sensor, transducers etc., that may clamped on or attached in any other way to a piping section to sense flow rate information. While FIGS. 2 to 9 show two high-pressure sources (e.g., tanks), there may be more than two-high pressure sources with each high-pressure source having a piping section similar to piping section 105 or 107. While FIGS. 2 to 9 show one bypass line (e.g., piping section 111) that can be used as a bypass for other piping sections (e.g., piping section 105, 107), additional bypass lines may be used in place of additional piping sections (e.g., two bypass lines for three piping sections, three bypass lines for five piping sections, etc.). For example two bypass lines (e.g., piping section 111) may be provided as a bypass for four piping sections (similar to piping section 105 and/or 107) and four high-pressure sources. For FIGS. 2 to 9, any of the systems (e.g., system 200, 300, etc.) can be installed onto a trailer (e.g., greater or smaller than 8 feet by 6 feet). For FIGS. 2 to 9, any of the systems can be removed from a trailer and placed in a stationary location. For FIGS. 2 to 9, any of the systems can be installed be in a cabinet. For FIGS. 2 to 9, any of the high-pressure tanks may have maximum pressure ratings below, at, or above 4,000 PSIG. Also, for FIGS. 2 to 9, any of the high-pressure tanks can be rated for other types of gases (e.g., nitrogen, oxygen, biogas, etc.) and the systems described in FIGS. 2 to 9 may be used to distribute the other types of gases.

For FIGS. 2 to 9, one or more examples have described opening or closing non-return valve 106. In such instances, the non-return valve 106 may be a screw down-type non-return valve. In the above examples, all instances of non-return valve 106 may be that no opening or closing occurs; instead, non-return valve 106 is a directional valve and only allows natural gas to flow in a particular direction without any backflow occurring. For FIGS. 2 to 9, any valve (e.g., v2, v5, v9, etc.), may be a ball-type valve or any other type of valve that can be opened or closed, manually, pneumatically, electronically, hydraulically, or electrically. For FIGS. 2 to 9, any control valve (e.g., c1) may be a gate-type, butterfly-type, globe-type, or any other type of control valve (can also be known as an actuator) that can be controlled, electronically, pneumatically, manually (e.g., mechanically), hydraulically, or electrically. For FIGS. 2 to 9, any non-return valve (e.g., v6) may any type of valve (such as a check valve) that prevents back flow of natural gas. In alternate embodiments, computing device 119 may send an electronic communication to another device (e.g., smartphone, laptop, etc.) and the information may be then used to manually switchover from one high-pressure tank to another high-pressure tank. For FIGS. 2 to 9, while the changeover between high-pressure tanks may occur when the amount of natural gas is less than a particular pressure level, in other instances, the changeover between high-pressure tanks may occur when the amount of natural gas pressure in the high-pressure tank is still above the particular pressure level (manually or automatically initiated, remotely or locally). In embodiments, this may occur if computing device 119 receives information that there is a problem within a system (e.g., an issue with the piping section) described in FIGS. 2 to 9. In embodiments, the problem may be a sudden change (e.g., a change that is greater than a particular value) in a particular reading within a particular period of time (e.g., a difference between two pressure readings, a difference between two flow rate readings, and/or a difference between two temperature readings). For example, a problem may be determined if the flow rate, temperature, and/or pressure changes that occurs within a particular time period that is associated with a leak. In embodiments, based on determining that there is a problem, computing device 119 (which may be located remotely) may send an electronic communication that results in the switchover between high-pressure tanks before the pressure is below the particular pressure level. Alternatively, based on displayed information (based on the electronic communication), a manual changeover sequence may commence, locally, by overriding the automatic changeover sequence which would have been based on information received by computing device 119 from valves, pressure monitoring devices, temperature monitoring devices, and/or flow rate monitoring devices associated with the system.

For FIGS. 2, 3, 6, and 7, before the example processes described herein occur, natural gas may be filled into all the piping sections by opening the one or more valves in a particular sequence but keeping v7 closed while the piping systems are becoming pressurized with natural gas. For example, c1 and c2 (e.g., simultaneously, within a particular time of each, etc.) may be opened after other valves are opened. In embodiments, natural gas may be sent through the entire system from either high-pressure source 110 or 112 (e.g., either source being a tank that can store natural gas, or any other type of gas, with a maximum pressure rating of 4,000 PSIG). Once natural gas is in the entire system, then the example processes described in FIGS. 2, 3, 6, and 7 may occur.

For FIGS. 2, 3, 6, and 7, each pressure reader 102 may have different pressure settings are used as thresholds by computing device 119 to determine to open or close the valves, control valves, and/or non-return valves. In embodiments, the different pressure settings may include low-low, low, high, and high-high. In embodiments, low-low reading may be associated with a first threshold (e.g., 500 PSIG) that indicates to computing device 119 that there is not enough supply from high-pressure source 110 or 112. Accordingly, computing device 119 may shut down supply from one pressure source and permit natural gas from the other pressure source. In embodiments, low reading may be associated with a second threshold (e.g., 1,000 psig) that indicates to computer device 119 that one pressure source is going to run out of natural gas within a particular amount of time. In embodiments, high reading may be associated with a third threshold that indicates to computing device 119 that there is a quantity of natural gas to provide continuous supply into the piping systems (as described in FIGS. 2, 3, 6, and 7). In embodiments, high-high reading may be associated with a fourth threshold that indicates to computing device 119 that a particular high pressure source is at full capacity.

For FIGS. 4, 5, 8, and 9, before the example processes that occur, natural gas may be filled into all the piping sections by opening the one or more valves in a particular sequence but keeping v1 and v8 closed while the piping sections are becoming pressurized with natural gas. For example, c1 and c2 (e.g., simultaneously, within a particular time of each, etc.) may be opened after other valves are opened. In embodiments, natural gas may be sent through the entire system from compressor 160 via v7 into the piping sections. Once natural gas is in the entire system, then the example processes described in FIGS. 2, 3, 6, and 7 may occur.

For FIGS. 4, 5, 8, and 9, each pressure reader 102 may have different pressure settings are used as thresholds by computing device 119 to determine to open or close the valves, control valves, and/or non-return valves. In embodiments, the different pressure settings may include low-low, low, high, and high-high. In embodiments, low-low reading may be associated with a first threshold (e.g., 500 PSIG) that indicates to computing device 119 that there is no natural gas in high-pressure storage 114 or 116. In embodiments, high-pressure storage 114 and 116 may each be a high-pressure tank that can store gas (e.g., natural gas, biogas, or any other type of gas) at a maximum of 4,000 PSIG. Accordingly, computing device 119 may send electronic communications to a compressor (e.g., compressor 160) to continue to supply high-pressure storage 114 or 116. In embodiments, a low reading may be associated with a second threshold (e.g., 1,000 psig) that indicates to computer device 119 that one pressure source has below a particular quantity of natural gas. In embodiments, a high reading may be associated with a third threshold that indicates to computing device 119 that there is a quantity of natural gas to provide continuous supply via the piping systems (as described in FIGS. 4, 5, 8, and 9) and the high-pressure storage 114 or 116 is nearing the completion of the filling process. In embodiments, high-high reading (e.g., 4,000 PSIG) may be associated with a fourth threshold that indicates to computing device 119 that the pressure in the piping system is at the maximum requirement needed to supply natural gas to high pressure storage 114 or 116. For FIGS. 4, 5, 8, and 9, a compressor 160 (e.g. one or more compressors) may be a type of compressor (e.g., reciprocating, rotary-screw, etc., with rated brake horsepower from 620 or above) that may operate with electric motors or engines (e.g., natural gas or another fuel) and provide compressed gas (e.g., 4,500 PSIG) for storage in a high-pressure tank.

Figure 10:
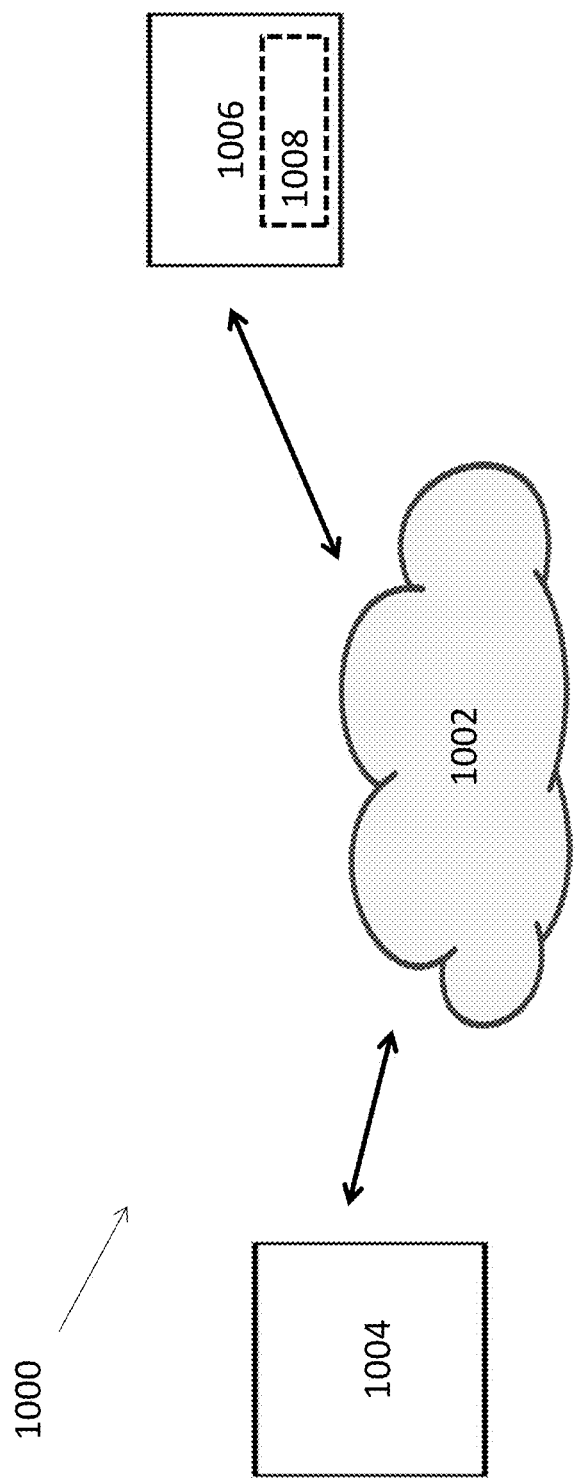
FIG. 10 is an example network diagram.

FIG. 10 is a diagram of example environment 1000 in which systems, devices, and/or methods described herein may be implemented. FIG. 10 shows network 1002, system 1004, device 1006, and application 1008.

Network 1002 may include a local area network (LAN), wide area network (WAN), a metropolitan network (MAN), a telephone network (e.g., the Public Switched Telephone Network (PSTN)), a Wireless Local Area Networking (WLAN), a WiFi, a hotspot, a Light Fidelity (LiFi), a Worldwide Interoperability for Microware Access (WiMax), an ad hoc network, an intranet, the Internet, a satellite network, a GPS network, a fiber optic-based network, and/or combination of these or other types of networks. Additionally, or network 1002 may include a cellular network, a public land mobile network (PLMN), a second-generation (2G) network, a third-generation (3G) network, a fourth-generation (4G) network, a fifth-generation (5G) network, and/or another network. In embodiments, network 1002 may allow for devices describe any of the described figures to electronically communicate (e.g., using emails, electronic signals, URL links, web links, electronic bits, fiber optic signals, wireless signals, wired signals, etc.) with each other to send and receive various types of electronic communications.

System 1004 may include one or more devices that can communicate and receive electronic information to/from device 1006 and/or application 1008 via network 1002. In embodiments, system 1004 may include valves, control valves, and/or non-return valves which may receive electronic information from device 1006 and/or application 1008 to turn on or off. In embodiments, system 1004 may include sensors and/or gauges that can communicate electronic information about pressure, temperature, and/or flow rates to device 1006 and/or application 1008 via network 1002. In embodiments, system 1004 may be system 200, 300, 400, 500, 600, 700, 800, and/or 900. In embodiments, system 1004 may include system 200, 300, 400, 500, 600, 700, 800, and/or 900, as well as additional systems (e.g., including valves, controllers, etc.) to control delivery of gas (e.g., natural gas). In embodiments, system 1004 may be powered by electrical power, solar power, and/or other type of power. In embodiments, system 1004 may be located at remote locations and be powered by its own power system which may be a generator system (e.g., operating on natural gas, diesel, etc.) a solar-powered panel system which generates power that is used by one or more of the portions of system 1004. In embodiments, system 1004 may include an uninterruptable power system (UPS) that provides for additional power (e.g., power for less than, equal to, or greater than seven days) to system 1004 in the event power from a solar-powered system or other system is not available. In embodiments, system 1004 may be placed on a vehicle (e.g., vehicle 127 in FIGS. 1A and 1B, a truck, tractor, watercraft, and/or any other type of vehicle) so that system 1004 can be moved from one location to another location. In embodiments, system 1004 may have high-pressure tanks (e.g., high pressure source 110, high pressure storage 114, etc.) that can be moved separately (e.g., on their own trailers, wheels, etc.) from remaining portions of system 1004 and can be replaced with different high-pressure storage tanks.

Device 1006 (e.g., computing device 119 and computing device 120) may include any computation or communications device that is capable of communicating with a network (e.g., network 1002). For example, device 1006 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smartphone, a desktop computer, a laptop computer, a tablet computer, a camera, a personal gaming system, a television, a set-top box, a digital video recorder (DVR), a digital audio recorder (DUR), a digital watch, a digital glass, or another type of computation or communications device.

Device 1006 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 1006. Device 1006 may have a touch screen and/or a keyboard that allows a user to electronically interact with an electronic application. In embodiments, a user may swipe, press, or touch device 1006 in such a manner that one or more electronic actions will be initiated by device 1006 via an electronic application.

Device 1006 may include a variety of applications, such as, for example, a gas analyzer application, a flow rate application, a temperature application, a composition analyzer application, an e-mail application, a telephone application, a camera application, a video application, a multimedia application, a music player application, a visual voice mail application, a contacts application, a data organizer application, a calendar application, an instant messaging application, a texting application, a web browsing application, a blogging application, and/or other types of applications that are a combination of two or more of the above applications (e.g., electronic application 1008).

Electronic application 1008 may be capable of interacting with device 1006 and/or system 1004 to automatically and electronically receive electronic information for one or more persons. In embodiments, electronic application 1008 may obtain electronic information about pressure, temperature, and/or flow rates associated with natural gas. In embodiments, electronic application 1008 may be associated with a graphical user interface that may display images, generate sounds, and/or display information associated with a system 1004.

Figure 11:
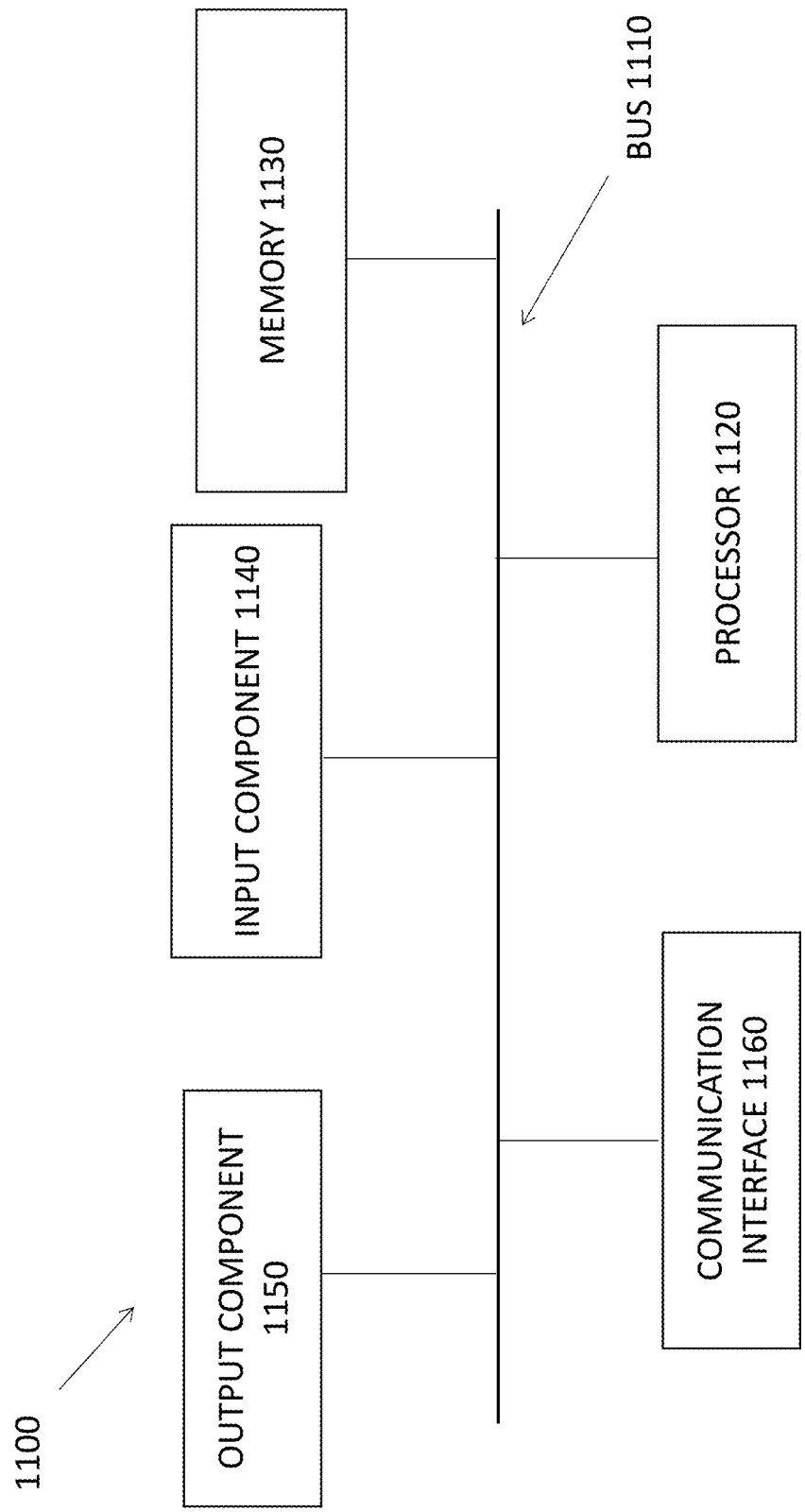
FIG. 11 is a diagram of an example computing device.

FIG. 11 is a diagram of example components of system 1004 and device 1006. Device 1100 may correspond to computing devices, such as computing device 119, computing device 120, a computing device feature that is part of systems 200, 300, 400, 500, 600, 700, 800, 900, and/or a computing device that is part of system 1004 and/or device 1006.

As shown in FIG. 11, device 1100 may include a bus 1110, a processor 1120, a memory 1130, an input component 1140, an output component 1150, and a communications interface 1160. In other implementations, device 1100 may contain fewer components, additional components, different components, or differently arranged components than depicted in FIG. 11. Additionally, or one or more components of device 1100 may perform one or more tasks described as being performed by one or more other components of device 1100.

Bus 1110 may include a path that permits communications among the components of device 1100. Processor 1120 may include one or more processors, microprocessors, or processing logic (e.g., a field-programmable gate array (FPGA) or an application-specific integrated circuit (ASIC)) that interprets and executes instructions. Memory 1130 may include any type of dynamic storage device that stores information and instructions, for execution by processor 1120, and/or any type of non-volatile storage device that stores information for use by processor 1120.

Input component 1140 may include a mechanism that permits a user to input information to device 1100, such as a keyboard, a keypad, a button, a switch, etc. Output component 1150 may include a mechanism that outputs information to the user, such as a display, a speaker, one or more light-emitting diodes (LEDs), etc.

Communications interface 1160 may include any transceiver-like mechanism that enables device 1100 to communicate with other devices and/or systems. For example, communications interface 1160 may include an Ethernet interface, an optical interface, a coaxial interface, a wireless interface, or the like.

In another implementation, communications interface 1160 may include, for example, a transmitter that may convert baseband signals from processor 1120 to radiofrequency (RF) signals and/or a receiver that may convert RF signals to baseband signals. Alternatively, communications interface 1160 may include a transceiver to perform functions of both a transmitter and a receiver of wireless communications (e.g., radiofrequency, infrared, visual optics, etc.), wired communications (e.g., conductive wire, twisted pair cable, coaxial cable, transmission line, fiber optic cable, waveguide, etc.), or a combination of wireless and wired communications.

Communications interface 1160 may connect to an antenna assembly (not shown in FIG. 11) for transmission and/or reception of the RF signals. The antenna assembly may include one or more antennas to transmit and/or receive RF signals over the air. The antenna assembly may, for example, receive RF signals from communications interface 1160 and transmit the RF signals over the air, and receive RF signals over the air and provide the RF signals to communications interface 1160. In one implementation, for example, communications interface 1160 may communicate with a network (e.g., wireless network, Internet, Intranet, etc.).

As will be described in detail below, device 1100 may perform certain operations. Device 1100 may perform these operations in response to processor 1120 executing software instructions (e.g., a computer program(s)) contained in a computer-readable medium, such as memory 1130, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 1330 from another computer-readable medium or another device. The software instructions contained in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

Figure 12:
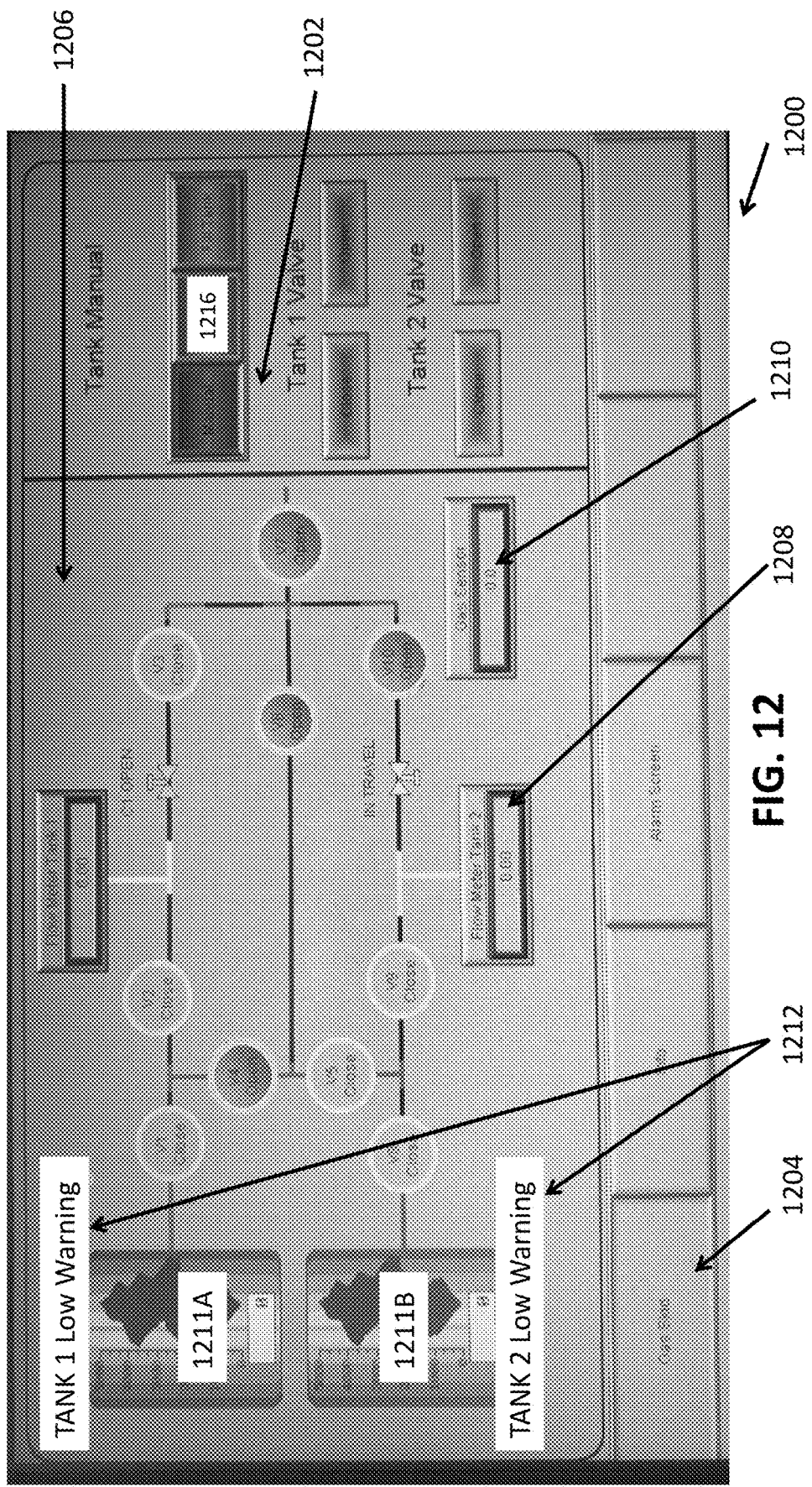
FIG. 12 is a diagram of an example electronic user interface.

FIG. 12 is an example user interface 1200. As shown in FIG. 12, user interface 1200 includes button 1202, button 1204, area 1206, icon 1208, icon 1210, and notices 1212. In embodiments, user interface 1200 is an electronic graphical user interface that can be displayed on a computing device (e.g., device 1006 or a part of system 1004). For example, user interface 1200 may be displayed on a monitoring device, a laptop, a smartphone, etc. In embodiments, user interface 1200 may be a touchscreen or may electronically interact with an electronic mouse or a keyboard that can be used to shift an electronic cursor around user interface 1200 to select various electronic features (e.g., icons, buttons, etc.). In embodiments, user interface 1200 may be part of electronic application 1008.

In embodiments, button 1202, when selected, generates one or more electronic communications that are sent to system 1004 (such as examples described in FIGS. 2 to 9). In embodiments, button 1202 is associated with a command that requires manual control of system 1004 which includes manually turning on or off one or more types of valves to control gas flow from one or more tanks. In embodiments, button 1204, when selected, generates area 1206 which shows an electronic schematic display of system 1004. In embodiments, area 1206 includes various features of system 1004, such as valves, flow meters (e.g., icon 1208), gas sensors (1210), and high-pressure tanks (1211A and 1211B). In embodiments, area 1206 can include electronic notifications such as notices in 1212. As shown in FIG. 12, notice 1212 can display warnings, such as low warnings that indicate low levels of natural gas in high-pressure tanks 1211A and/or 1211B. As shown in FIG. 12, with low tank warnings, one or more valves, as shown on the display, are closed (such as v1). In addition, a low tank warning may also be associated with an alarm, flashing light, and/or any other type of audio or visual indicator that is connected or part of system 1004.

Figure 13:
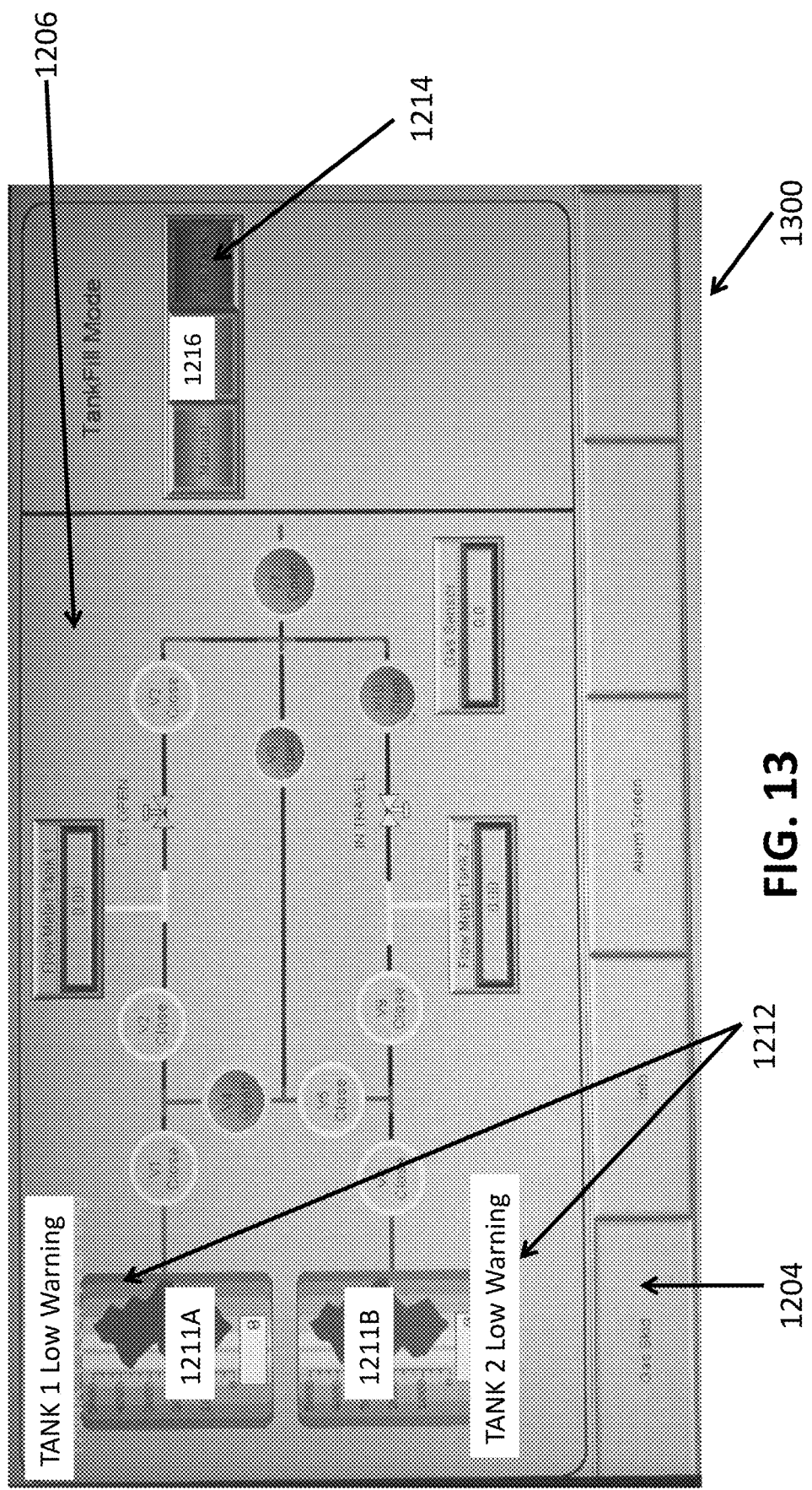
FIG. 13 is a diagram of an example electronic user interface.

FIG. 13 is an example user interface 1300. In embodiments, user interface 1300 may be include features described in user interface 1200 in FIG. 12. As shown in FIG. 13, button 1214 has been selected (e.g., via touch, using an electronic mouse, etc.) which changes from distributing gas from tanks to distributing gas to one or more tanks. As shown in FIG. 13, a portion of the valves are open while other valves are closed based on which tank (tank 1 and tank 2) is to be filled. As shown in FIG. 13, notice 1212 indicates that both tanks have low pressure. As shown in FIG. 13, with low tank warnings, one or more valves, as shown on the display, are closed (such as v1). In addition, a low tank warning may also be associated with an alarm, flashing light, and/or any other type of audio or visual indicator that is connected or part of system 1004.

Figure 14:
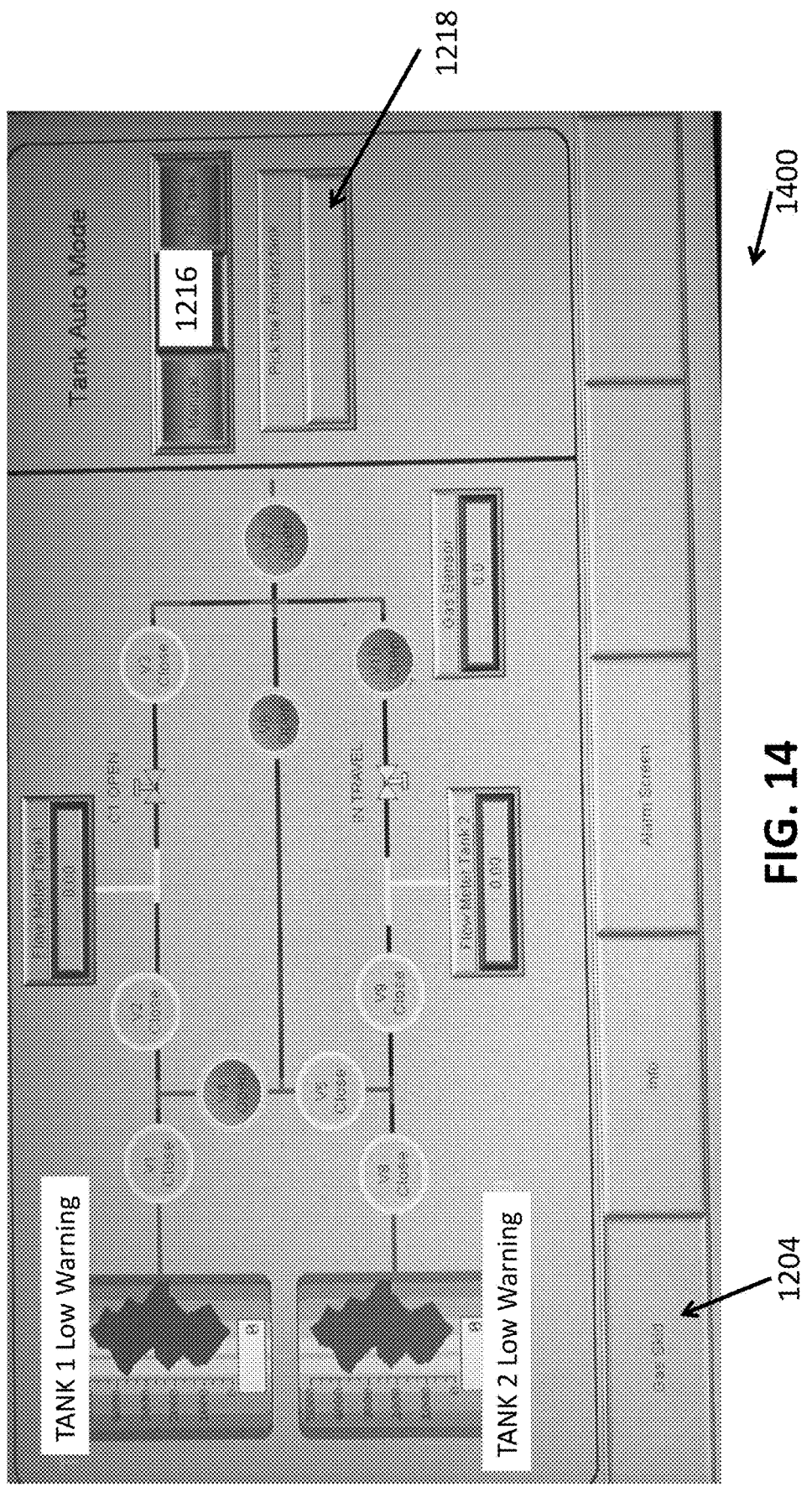
FIG. 14 is a diagram of an example electronic user interface.

FIG. 14 is an example user interface 1400. As shown, user interface 1400 may include features described in user interface 1200 (in FIG. 12) and/or user interface 1300 (in FIG. 13). As shown in FIG. 14, button 1216 has been selected and allows for one or more valves in system 1004 to distribute gas from tanks. Also shown in FIG. 14, button 1218, when electronically selected, may select one or more tanks. Accordingly, one or more valves may automatically open and allow for gas to flow to one or more tanks. As shown in FIG. 14, when both tanks are low in pressure, then multiple valves will be closed (such as v1). In addition, a low tank warning may also be associated with an alarm, flashing light, and/or any other type of audio or visual indicator that is connected or part of system 1004.

Figure 15:
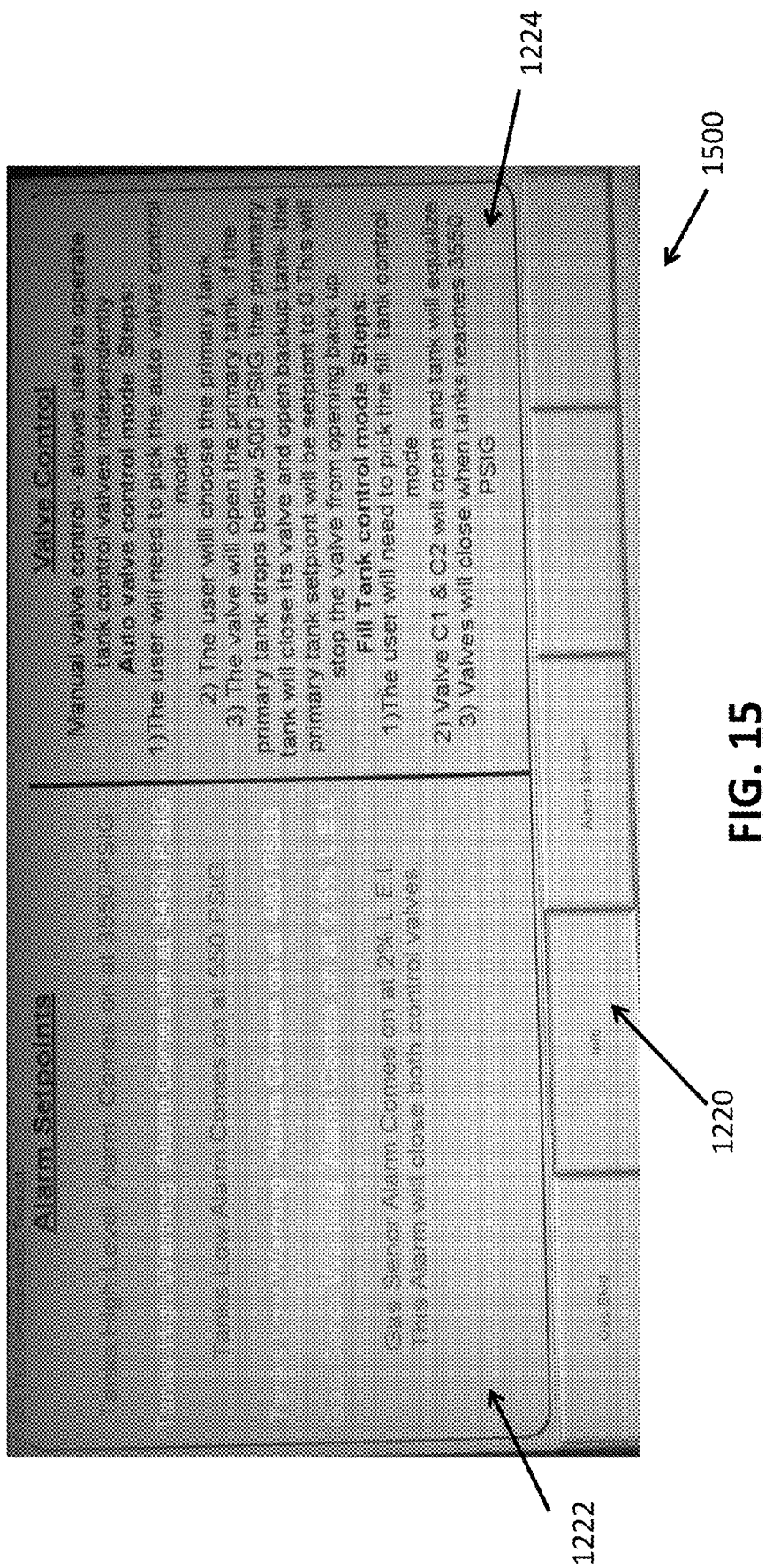
FIG. 15 is a diagram of an example electronic user interface.

FIG. 15 is an example user interface 1500. As shown, user interface 1500 may include features described in user interface 1200, 1300, and/or 1400 as described in other figures. As shown in FIG. 15, button 1220 has been electronically selected. By selecting button 1220, an electronic display is provided which includes areas 1222 and 1224. As shown in FIG. 15, area 1222, information about electronic alarm setpoints are provided. As shown in FIG. 15, area 1224, information is given about steps to take for manual valve control. In embodiments, FIGS. 12 to 15, the user interfaces may be part of a video display unit with graphical user interface capabilities. In embodiments, the video display unit may be part of a control box (e.g., device 1006). In embodiments, a video display unit and/or control box may be located at system 1004, located remotely from system 1004. In embodiments, one video display unit and/or control box may be located at both system 1004 and remotely from system 1004. In embodiments, the control box may have different light indicators associated with different statuses of system 1004. For example, one color (e.g., a red light) may indicate that a particular tank and/or piping section is not available, another color (e.g., amber light) may indicate that a particular tank and/or piping section is ready and on standby, and an additional color (e.g., green light) indicates that a particular tank and/or piping section is in operation. In embodiments, the lights may be provided as part of a graphical user interface or as physical lights (e.g., light emitting diode (LED) lights, incandescent light, fluorescent light).

FIG. 16 is an example table that describes changeover from one high-pressure source to another high-pressure source that is distributing natural gas to an end-user/operator. In embodiments, FIG. 16 may describe processes that may be conducted by FIGS. 2, 3, 6, and/or 7. For example, Run A may be piping sections 105, 113, and 115 while Run B may be piping sections 107, 117, and 113. As shown in FIG. 16, row 1628 shows that Run A is not providing any natural gas to the end-user as there is no flow (flow 116) and valve 1610 (e.g., v1) is closed. However, pressure 1608 indicates that there is pressure in the tank (e.g., high-pressure source 110). At the same time, as shown across row 1628, there if flow 1618, a valve 1622 (e.g., v8) is open and light 1624 indicates that Run B is operational (i.e., providing natural gas). As shown in pressure 1620, for row 1628, the pressure is falling which indicates that the high-pressure tank (e.g., high-pressure source 112) for Run B becoming depleted with natural gas.

Row 1630 now indicates that the high-pressure tank for Run B is empty based on light 1624. Thus, as shown in row 1632, for Run A, flow 1606 indicates that flow is occurring (YES) and valve 1610 is opening and light 1612 indicates that the high-pressure tank is moving from standby to operational. Row 1632 also shows, for Run B, that valve 1622 is closing and that the high-pressure tank associated with Run B is moving from operational to closing. At row 1634, the valve 1610 is open, flow 1606 is occurring, and the amount of pressure from the high-pressure tank is falling since natural gas is leaving the high-pressure tank and is entering Run A. At row 1634, light 1612 indicates that Run A is operational. Also at row 1634, Run B is no longer sending gas from its high-pressure tank as valve 1622 is closed and light 1624 indicates that the high-pressure tank associated with Run B is empty. As shown in FIG. 16, row 1636 still indicates the flow of natural gas via Run A. At row 1638, another high-pressure tank has been connected with Run B. This new high-pressure tank has pressure but as valve 1622 is closed, no gas is being distributed from the new high-pressure tank. However, in row 1640, the high-pressure tank for Run A is running low (as pressure is falling) and valve 1610 is in the process of closing. Also shown on row 1640, pressure 1620 indicates that pressure from the new high-pressure tank is falling (as gas is leaving the new high-pressure tank) and valve 1622 is opening.

Thus, at row 1642, the high-pressure tank for Run A is empty and valve 1610 is closed while the new high-pressure tank for Run B is sending gas through the piping sections as valve 1622 is open and light 1624 indicates that Run B is operational.

FIGS. 17A and 17B are example processes for filling tanks. As shown in FIG. 17A, a process occurs prior to tanks being filled. In this process, valves are closed and opened in a particular fashion. While FIG. 17A shows valves closing and opening in a particular pattern, other patterns of opening and closing valves may occur. In this non-limiting example, valves v4, v5, and v6 are closed as shown in Position 1704 and these are associated with a bypass piping section such as piping section 111 as shown in FIGS. 2 to 9. As shown in FIG. 17A, valve v7 is opened and gas enters a system (e.g., system 400), so as to purge the system of any air, v1 is closed and is shown as being associated with trailer A (e.g., a high pressure tank). Then, v2 and v3 are opened and are associated with trailer A. Further, as shown in FIG. 17A, v8, v9, and v10 are opened for Trailer B. At this point, a low-low pressure alarm may occur as both Trailer A and B have low pressure (i.e., they have not yet been filled with a particular amount of natural gas).

In this process, C1 opens and is associated with Trailer A. Then, C2 opens and is associated with Trailer B. In this example, C1 and C2 may be similar to c1 and c2 in one or more of the above described figures (e.g., FIG. 2). Then, V8 is closed (associated with Trailer B), C2 is then closed, and then V8 is opened.

FIG. 17B then describes an example process of filling tanks (e.g., Trailer A and/or B). As shown in FIG. 17B, line 1710 indicates that the valves are set as described above (described in FIG. 17A). At line 1712, C1 is opened and filling of Trailer A occurs while Trailer B is on standby. At line 1714, C2 is kept closed while filling of Trailer A is still occurring. At line 1716, v8 opens and a low-low pressure alarm occurs since Trailer B has low level of pressure. At line 1718, high pressure alarm A indicates that Trailer A is above a particular threshold pressure and is going to reach a maximum pressure within a particular amount of time. At line 1720, C1 is closing and C2 is opening. Thus, a changeover now occurs between Trailer A and B. At line 1722, C1 is now closed and C2 is now open with Trailer A shutdown and filling of natural gas into Trailer B. At line 1724, a high pressure alarm may indicate that Trailer A is full.

At line 1726, v1 is open and pressure is shown decreasing as a new Trailer A is now attached while the old Trailer A has been removed. At line 1728, a low pressure alarm is given for Trailer A. At line 1730, a high alarm indicates that Trailer B is above a particular threshold pressure and is going to reach a maximum pressure within a particular amount of time. Thus, lines 1732 to 1738 repeat the same process as described in lines 1720 to 1726 except the changeover is now from Trailer B to Trailer A. At line 1740, the same process may repeat again, starting from line 1718.

Thus, a changeover now occurs between Trailer A and B. At line 1722, C1 is now closed and C2 is now open with Trailer A shutdown and filling of natural gas into Trailer B. At line 1724, a high pressure alarm may indicate that Trailer A is full.

At line 1726, v1 is open and pressure is shown decreasing as a new Trailer A is now attached while the old Trailer A has been removed. At line 1728, a low pressure alarm is given and associated with Trailer A. At line 1730, a high alarm indicates that Trailer B is above a particular threshold pressure and is going to reach a maximum pressure within a particular amount of time. Thus, lines 1732 to 1738 repeat the same process as described in lines 1720 to 1726 except the changeover is now from Trailer B to Trailer A. At line 1740, the same process may repeat again, starting from line 1718.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, high-pressure source may be interchangeably used with high-pressure tanks. Furthermore, a high-pressure source may be a type of tank, vessel, storage device, or any other container that contains gas. In the preceding specification, as shown in FIGS. 2 to 9, each of the valves, pressure readers, flow rate readers, and/or temperature readers, may receive or send electronic information via wired or wireless communications to computing device 119.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An apparatus, comprising:
   a first piping section (105);
   a first valve (v1);
   a second valve (v2);
   a third valve (v3);
   a first control valve (c1);
     a first non-return valve, wherein the first valve (v1), the second valve (v2), the first non-return valve, and the third valve (v3) are located on the first piping section (105), and the first non-return valve is located after the first control valve (c1) and before the third valve (v3);
   a first high-pressure tank (110);
   a second high-pressure tank (112);
     wherein, on the first piping section (105), the first control valve (c1) is located closer to the first high-pressure tank (110) than the first non-return valve;
   a fourth valve (v9);
   a second non-return valve, wherein the fourth valve (v9) and the second non-return valve are located on a second piping section (107);
   a third piping section (109), wherein the third piping section (109) is connected to the first piping section (105) and the second piping section (107);
   a fourth piping section (113), wherein the fourth piping section (113) is connected to an end of the first piping section (105) that is closest to the first valve (v1) and the fourth piping section (113) is also connected to an end of the second piping section (107) that is closest to the fourth valve (v9);
   a fifth piping section (111), wherein:
     the fifth piping section (111) includes a third non-return valve and a fifth valve (v6),
     the fifth piping section (111) connects to the third piping section (109) and the fourth piping section (113), wherein the fifth piping section (111) is configured to bypass natural gas from the first piping section (105) based on the pressure level of the natural gas being below a threshold level, and
     no portion of the fifth piping section (111) is connected to the first high-pressure tank (110) or the second high-pressure tank (1120; and
   a computing device (119).

2. The apparatus of claim 1, wherein the first high-pressure tank (110) is connected to another end of the first piping section (105) that is closest to the first valve (v1).

3. The apparatus of claim 1, further comprising:
   a pressure reader (102); and
   a temperature reader (108), wherein the pressure reader (102) and the temperature reader (108) are located between the first control valve (c1) and the second valve (v2), and wherein the temperature reader (108) is also located before the second valve (v2) and the pressure reader (102).

4. The apparatus of claim 1, wherein the second high-pressure tank (112) is connected to the second piping section (107).

5. The apparatus of claim 1, wherein, on the fifth piping section (111), the third non-return valve is closer to the third piping section than the fifth valve (v6).

6. The apparatus of claim 1, wherein the first control valve (c1) is located further away from the first high pressure tank (114) than the first valve (v1).

7. The apparatus of claim 1, wherein the first high-pressure tank (110) is between 4,000 and 5,000 PSIG.

8. The apparatus of claim 1, wherein the computing device (119) includes a graphical user display.

9. The apparatus of claim 1, wherein a sixth valve (v4) and a seventh valve (v5) are located on the third piping section (109) and wherein the fifth piping section (111) connects to the third piping section (109) at a location that is between the sixth valve (v4) and the seventh valve (v5).

10. The apparatus of claim 3, wherein the pressure reader (102) is located on the first piping section (105) between the second valve (v2) and the first control valve (c1).

11. The apparatus of claim 3, further comprising:
    a second control valve (c2);
    a second pressure reader; and
    a second temperature reader, wherein:
      the second pressure reader and the second temperature reader are located on the second piping section (107), and the second temperature reader is:
      located between the fourth valve (v9) and the second control valve (c2), and
      is also located between the second pressure reader and the fourth valve (v9).

12. The apparatus of claim 3, further comprising:
    a flow rate reader (104), wherein the flow rate reader (104) includes electronic features that communicate with the computing device (119).

13. The apparatus of claim 12, further comprising:
    a sixth piping section (115); and
    an eighth valve (v7),
      wherein the sixth piping section (115) is connected to the fourth piping section (113) and the eighth valve (v7), and
      wherein a customer system, that is a natural gas pipeline system, receives natural gas through the eighth valve (v7).

14. The apparatus of claim 11, wherein the computing device (119) controls the first control valve (c1) and the second control valve (c2).

15. The apparatus of claim 1, wherein the computing device (119) enables the graphical user display to electronically display:
    the first control valve (c1);
    the first non-return valve, wherein the graphical user display displays the first valve (v1), the second valve (v2), the first non-return valve, and the third valve (v3) are located on the first piping section (105), and the first non-return valve is located after the first control valve (c1) and before the third valve (v3); and
    a warning display for the first high-pressure tank (110).

16. The apparatus of claim 15, further comprising:
    a pressure reader (102); and
    a temperature reader (108), wherein the pressure reader (102) and the temperature reader (108) are located between the first control valve (c1) and the second valve (v2),
      wherein, the temperature reader (108) is also located before the second valve (v2) and the pressure reader (102), and wherein the pressure reader sends pressure information to the computing device (119), and the computing device (119) is configured to determine whether natural gas from the first high-pressure tank (110) be sent through the first piping section (105), the second piping section (107), or the fifth piping section (111).

17. The apparatus of claim 15, wherein:
the apparatus is configured to send natural gas from the first high-pressure tank (110) when the non-return valve is in a first direction at a first location, and
the apparatus is configured to send natural gas to the first high-pressure tank (110) when the non-return valve is in a second direction at the first location.

18. A method, comprising:
receiving, by a system, natural gas from a first high-pressure tank (110),
wherein the system includes a piping system, a computing device (119), and a graphical user display;
sending, by the system, the natural gas through a first piping section (105) that is part of the piping system;
wherein the first piping section (105) includes:
a first valve (v1),
a second valve (v2),
a third valve (v3),
a first control valve (c1),
a first non-return valve, wherein the first valve (v1), the second valve (v2), the first non-return valve, and the third valve (v3) are located on the first piping section (105), and the first non-return valve is located after the first control valve (c1) and before the third valve (v3),
a first pressure reader (102), and
a second pressure reader (102);
receiving, by the system, additional natural gas from a second, high-pressure tank (112);
sending, by the system, the additional natural gas through a second piping section (107) that is part of the piping system;
wherein the second piping section (107) includes:
a fourth valve (v9), and
a second non-return valve, and
a second control valve (c2),
wherein a third piping section (109) connects to the first piping section (105) and the second piping section (107), and a fourth piping section (113) connects to ends of the first piping section (105) and the second piping section (107); and
displaying, by the system, via the graphical user display, components of the system.

19. The method of claim 18, further comprising:
determining, by the system, that there is a leak on the first piping section, based on pressure information sent from the pressure reader (102) to the computing device (119);
sending, by the system, an electronic communication to the first control valve (c1) to shut off;
bypassing, by the system, the natural gas from the first piping section (105) to a fifth piping section (111) via the third piping section (109) based on shutting off the first control valve (c1),
wherein the fifth piping section (111) includes a third non-return valve and a fifth valve (v6), and the fifth piping section (111) connects to the third piping section (109) and the fourth piping section (113).

20. The method of claim 18, wherein the displaying via the graphical user display includes displaying:

the first control valve (c1);
the first non-return valve, wherein the graphical user display is configured to display the first valve (v1), the second valve (v2), the first non-return valve, the third valve (v3) as
a warning display associated with the first high-pressure tank (110).

21. The method of claim 18, wherein the third piping section (109) includes a fifth valve (v6),; and
the method further comprising:
determining, by the system, that filling of either the first high-pressure tank (110) or the second high-pressure tank (112) is required, wherein directions of the first non-control valve or the second non-control valve are switched so as to switch direction of a first quantity of natural gas flowing through the first non-control valve or the second non-control valve;
receiving, by the system, electronic information that the first control valve (c1) is opened and a second quantity of natural gas is being sent to the first high-pressure tank (110) through the first piping section (105);
receiving, by the system, electronic information that high-pressure tank (112) is on standby;
keeping, by the system, the second control valve (c2) closed;
opening a tenth valve (v1), based on the computing device (119) receiving electronic information that the second high-pressure tank (112) has a first pressure level that is below a particular pressure level that is associated with a low-low pressure reading;
receiving, by the system, additional electronic information that the first high-pressure tank (110) is above a particular threshold pressure;
closing, by the system, the first control valve (c1) and, simultaneously, opening the second control valve (c2); and
sending, by the system, a third amount of natural gas to the second high-pressure tank (112).

22. The method of claim 21, further comprising:
determining, by the system, a fourth amount of natural gas to;
sending, by the system, the fourth amount of natural gas from the second high-pressure tank (112) via the second piping section (107);
receiving, by the system, electronic pressure information that a second pressure level associated with the second high-pressure tank (112), is decreasing;
receiving, by the system, that the second pressure level is below a first pressure threshold;
closing, by the system, the second control valve (c2) and, simultaneously, opening, by the system, the first control valve (c1); and
sending, by the system, a fifth amount of natural gas through the first piping section (105).

23. The method of claim 21, further comprising:
determining, by the system, a fourth amount of natural gas;
sending, by the system, the fourth amount of natural gas from the second high-pressure tank (112) via the second piping section (107);
receiving, by the system, electronic pressure information that a second pressure level associated with the second high-pressure tank (112), is decreasing;
receiving, by the system, that the second pressure level is below a pressure threshold level;

receiving, by the system, that a third pressure level, associated with the first high-pressure tank (110) is also below the pressure threshold level;

keeping, by the system, the second control valve (c2) open and, simultaneously, opening, by the system, the first control valve (c1); and sending, by the system, a fifth amount of natural gas through the first piping section (105) from the first high-pressure tank (110) while sending the natural gas supply from the second high-pressure tank (112) through the second piping section (107); and combining, by the system, the fourth amount of natural gas and the fifth amount of natural gas in the fourth piping section (113).

\* \* \* \* \*